US012050863B1

(12) United States Patent
Doherty et al.

(10) Patent No.: US 12,050,863 B1
(45) Date of Patent: Jul. 30, 2024

(54) METHOD FOR AUTOMATICALLY GENERATING RESPONSIVE MEDIA

(71) Applicant: Yieldmo, Inc., Nashua, NH (US)

(72) Inventors: Connor Doherty, Nashua, NH (US); Farid Jawde, Nashua, NH (US); David Sebag, New York, NY (US); Michael Yavonditte, Nashua, NH (US)

(73) Assignee: Yieldmo, Inc., Nashua, NH (US)

( * ) Notice: Subject to any disclaimer, the term of this patent is extended or adjusted under 35 U.S.C. 154(b) by 0 days.

(21) Appl. No.: 18/376,812

(22) Filed: Oct. 4, 2023

Related U.S. Application Data

(63) Continuation-in-part of application No. 16/857,139, filed on Apr. 23, 2020, now abandoned, which is a continuation of application No. 15/872,688, filed on Jan. 16, 2018, now Pat. No. 10,692,531, which is a continuation-in-part of application No. 15/466,603, filed on Mar. 22, 2017, now Pat. No. 10,789,983, which is a continuation of application No. 15/217,879, filed on Jul. 22, 2016, now Pat. No. 9,852,759, which is a continuation-in-part of application No. 15/048,994, filed on Feb. 19, 2016, (Continued)

(51) Int. Cl.
*G06F 17/00* (2019.01)
*G06F 40/106* (2020.01)
*G06F 40/186* (2020.01)

(52) U.S. Cl.
CPC .......... *G06F 40/186* (2020.01); *G06F 40/106* (2020.01)

(58) Field of Classification Search
CPC ............................ G06F 40/186; G06F 40/106
See application file for complete search history.

(56) References Cited

U.S. PATENT DOCUMENTS

| 8,140,641 B2 * | 3/2012 | Silverman | ........... H04L 67/1095 709/219 |
| 9,026,912 B2 * | 5/2015 | Grover | ................ G06F 16/4393 715/716 |

(Continued)

FOREIGN PATENT DOCUMENTS

WO   WO-2015153942 A1 * 10/2015   ....... G06F 17/30053

*Primary Examiner* — Laurie A Ries
(74) *Attorney, Agent, or Firm* — Run8 Patent Group, LLC; Peter Miller; Leah Raddatz

(57) ABSTRACT

A method includes: accessing a static visual objects, and media formats; defining a multi-dimensional feature space representing possible arrangements of combinations of the set of static visual objects within the set of media formats; generating a primary feature container distributed within the multi-dimensional feature space; generating a primary responsive media, by inserting the primary subset of static visual objects into the primary media format according to a primary arrangement of the primary subset of static visual objects represented in the feature container; presenting the primary responsive media to an operator; in response to receiving a selection of the primary responsive media generating a secondary feature container distributed within the multi-dimensional feature space proximal the primary feature container; generating a secondary responsive media, and serving the secondary responsive media to a first device for playback to a first user responsive to inputs by the first user at the first device.

20 Claims, 10 Drawing Sheets

Related U.S. Application Data now abandoned, which is a continuation-in-part of application No. PCT/US2015/064460, filed on Dec. 8, 2015.

(60) Provisional application No. 62/197,929, filed on Jul. 28, 2015, provisional application No. 62/119,176, filed on Feb. 21, 2015, provisional application No. 62/068,646, filed on Oct. 25, 2014.

(56) References Cited

U.S. PATENT DOCUMENTS

| | | | | |
|---|---|---|---|---|
| 9,870,629 | B2* | 1/2018 | Cardno | G06Q 30/02 |
| 2007/0112714 | A1* | 5/2007 | Fairweather | G06F 8/427 |
| | | | | 706/46 |
| 2009/0177301 | A1* | 7/2009 | Hayes | G11B 19/025 |
| | | | | 707/999.005 |
| 2011/0106784 | A1* | 5/2011 | Terheggen | G06F 16/438 |
| | | | | 707/706 |
| 2011/0261049 | A1* | 10/2011 | Cardno | G06Q 40/04 |
| | | | | 345/419 |
| 2013/0150990 | A1* | 6/2013 | Campiranon | G09B 5/06 |
| | | | | 700/94 |
| 2018/0167686 | A1* | 6/2018 | James | H04N 21/4725 |
| 2018/0189990 | A1* | 7/2018 | Cardno | G06T 11/206 |
| 2020/0143106 | A1* | 5/2020 | Long | H04L 43/04 |
| 2021/0182282 | A1* | 6/2021 | Silverstein | G06T 11/206 |

* cited by examiner

METHOD FOR AUTOMATICALLY GENERATING RESPONSIVE MEDIA

CROSS-REFERENCE TO RELATED APPLICATIONS

This Application is related to U.S. Pat. No. 9,852,759, filed on 22 Jul. 2016, U.S. Pat. No. 10,692,531, filed on 16 Jan. 2018, and U.S. patent application Ser. No. 18/128,780, filed on 30 Mar. 2023, each of which is incorporated in its entirety by this reference.

This Application is also a continuation-in-part of U.S. patent application Ser. No. 16/857,139, filed on 23 Apr. 2020, which is a continuation of U.S. patent application Ser. No. 15/872,688, filed on 16 Jan. 2018, which is: a continuation-in-part application of U.S. patent application Ser. No. 15/048,994, filed on 19 Feb. 2016, which claims the benefit of U.S. Provisional Application No. 62/119,176, filed on 21 Feb. 2015, both of which are incorporated in their entireties by this reference; a continuation-in-part application of U.S. patent application Ser. No. 15/466,603, filed on 22 Mar. 2017, which is a continuation application of U.S. patent application Ser. No. 15/217,879, filed on 22 Jul. 2016, which claims the benefit of U.S. Provisional Application No. 62/197,929, filed on 28 Jul. 2015 and is a continuation-in-part (or "bypass") application of PCT Application No. PCT/US15/64460, filed on 8 Dec. 2015, which claims priority to U.S. Provisional Application No. 62/068,646, filed on 25 Oct. 2014, all of which are incorporated in their entireties by this reference; and is related to U.S. patent application Ser. No. 14/592,883, filed on 8 Jan. 2015, which claims priority to U.S. Provisional Application No. 62/068,646, filed on 25 Oct. 2014, both which are incorporated in their entireties by this reference.

TECHNICAL FIELD

This invention relates generally to the field of media generation and more specifically to a new and useful method for automatically generating responsive media.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
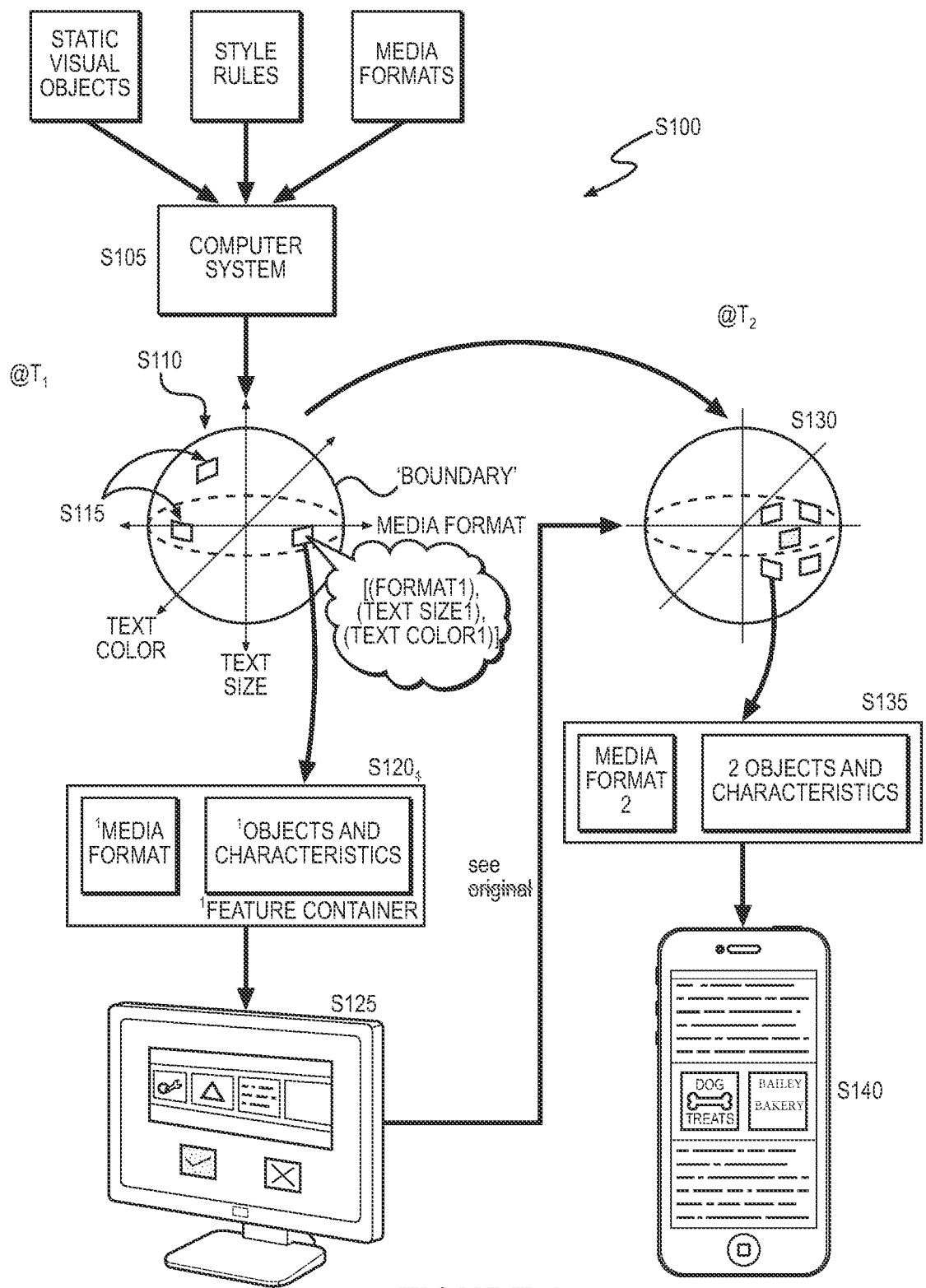
FIG. 1 is a flowchart representations of a method.

As shown in FIG. 1, a method S100 includes: accessing a set of static visual objects, a set of style rules, and a set of media formats in Block S105; defining a multi-dimensional feature space representing possible arrangements of combinations of the set of static visual objects within the set of media formats and bounded by the set of style rules in Block S110; and generating a primary set of feature containers distributed within the multi-dimensional feature space in Block S115.

For each feature container, in the primary set of feature containers, the method includes: retrieving a primary subset of static visual objects, in the set of static visual objects, represented in the feature container; retrieving a primary media format, in the set of media formats, represented in the feature container; and generating a primary responsive media, in a primary set of responsive media, by inserting the primary subset of static visual objects into the primary media format according to a primary arrangement of the primary subset of static visual objects represented in the feature container in Block S120.

The method additionally includes: presenting the primary set of responsive media to an operator in Block S125; and, in response to receiving a first selection of a target primary responsive media, in the primary set of responsive media, generating a secondary set of feature containers distributed within the multi-dimensional feature space proximal a target primary feature container, corresponding to the target primary responsive media in Block S130.

For each feature container, in the secondary set of feature containers, the method includes: retrieving a secondary subset of static visual objects, in the set of static visual objects, represented in the feature container; retrieving a secondary media format, in the set of media formats, represented in the feature container; and generating a secondary responsive media, in a secondary set of responsive media, by inserting the secondary subset of static visual objects into the secondary media format according to a secondary arrangement of the secondary subset of static visual objects represented in the feature container in Block S135.

The method S100 further includes: serving a first secondary responsive media, in the secondary set of responsive media, to a first device for playback to a first user responsive to inputs by the first user at the first device in Block S140.

1.1 Variation: Full Automation

Figure 2A:
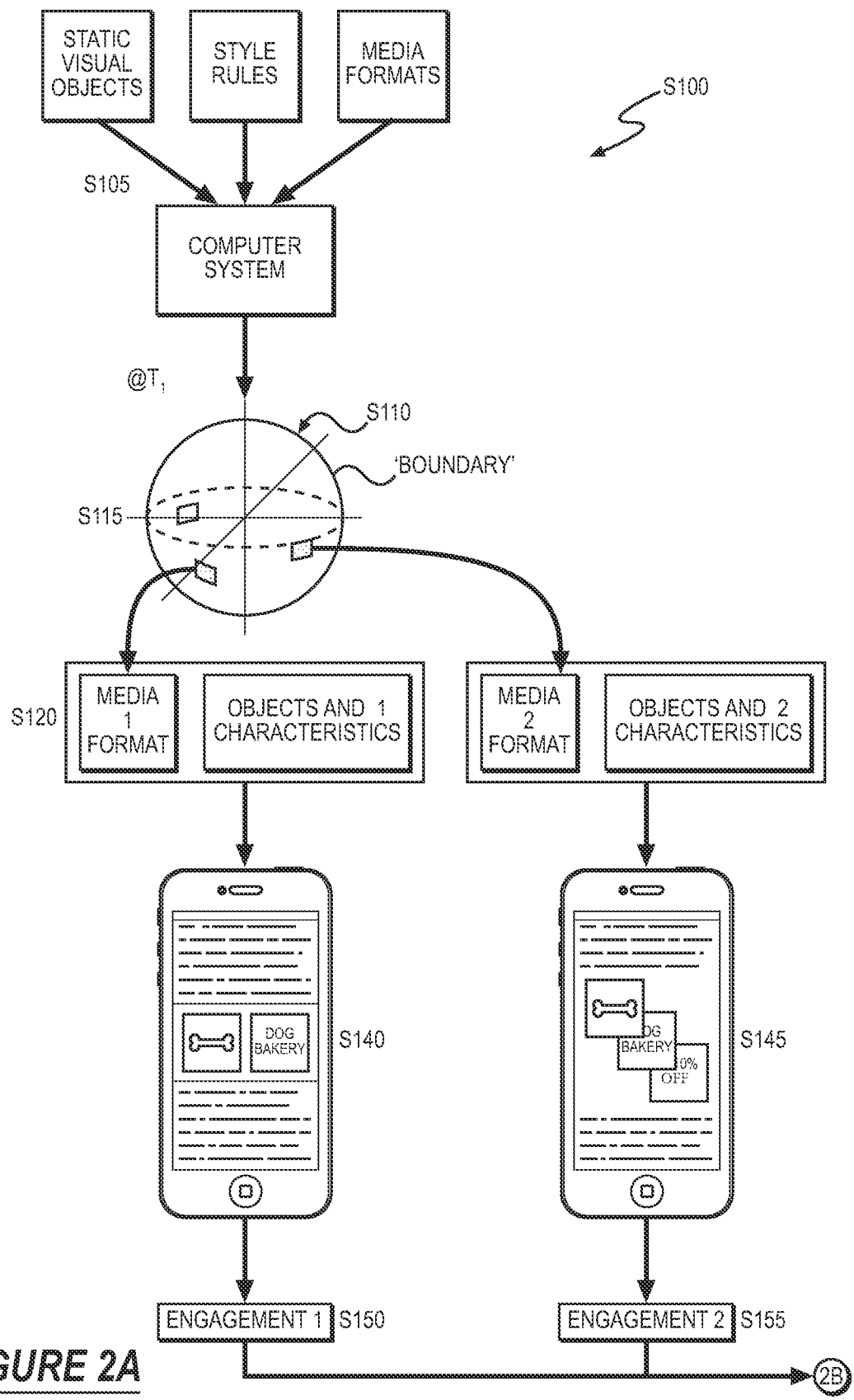
FIGS. 2A and 2B are flowchart representations of a variation of the method.
Figure 2B:
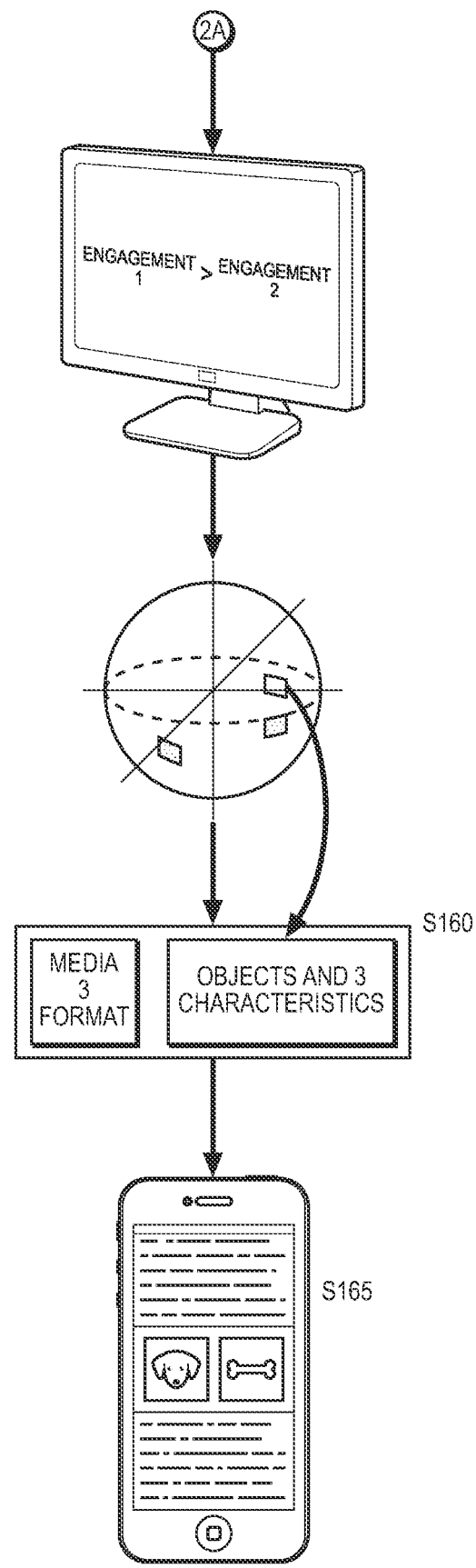
Figure 5:
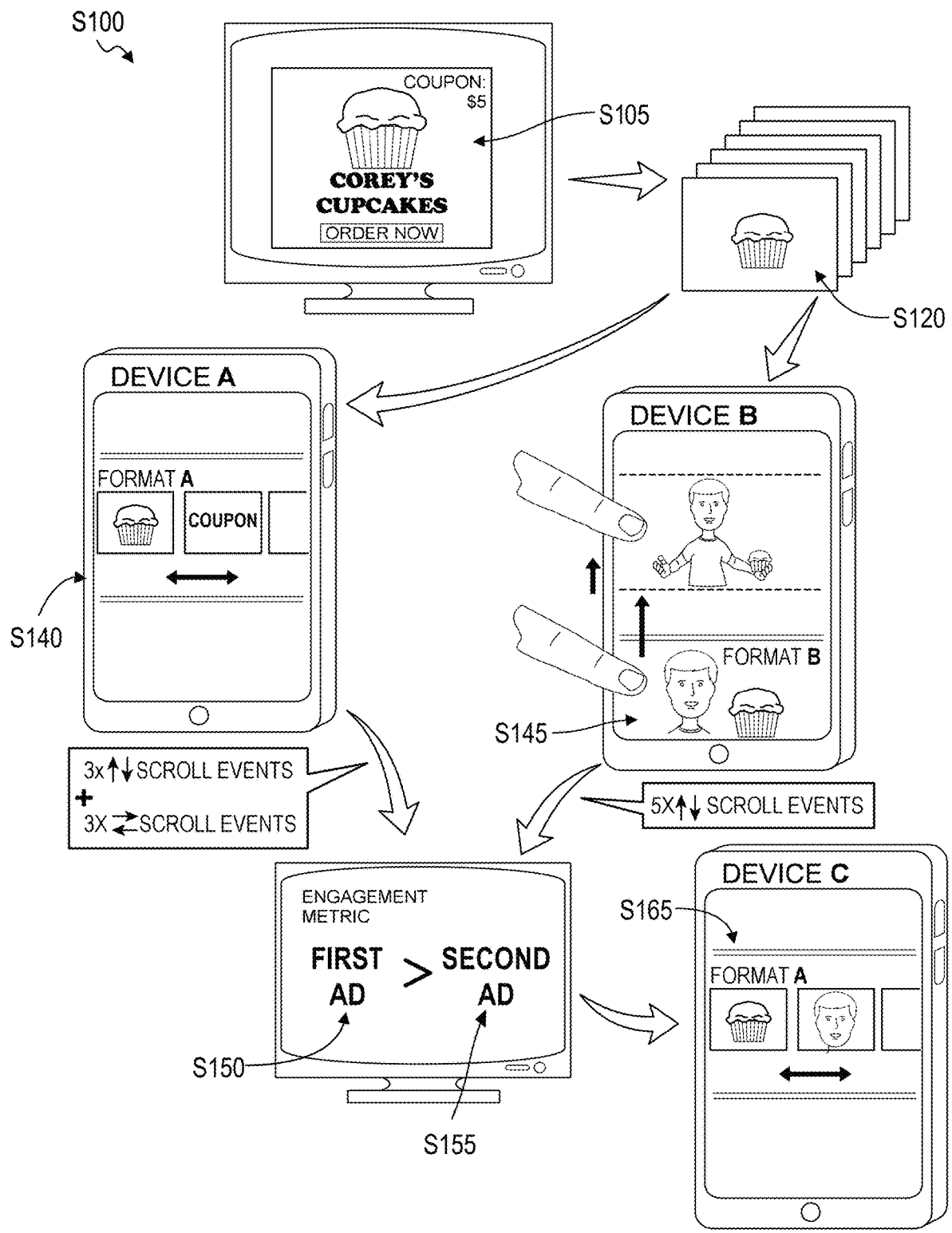
FIG. 5 is a flowchart representation of a variation of the method.

In one variation shown in FIGS. 2A, 2B, and 5, the method S100 includes, rather than presenting the set of responsive media to the operator to refine the responsive media, serving a responsive media from the set of responsive media to a user and refining the set of responsive media based on an engagement metric of the served responsive media.

This variation of the method S100 includes: accessing a set of static visual objects, a set of style rules, and a set of media formats in Block S105; and defining a multi-dimensional feature space representing possible arrangements of combinations of the set of static visual objects within the set of media formats and including a boundary defined by the set of style rules in Block S110.

During a first time interval, the method includes generating as primary set of feature containers distributed within the multi-dimensional feature space in Block S115 by, for each feature container, in the primary set of feature containers: retrieving a primary subset of static visual objects, in the set of static visual objects, represented in the feature container; retrieving a primary media format, in the set of media formats, represented in the feature container; generating a primary responsive media, in a primary set of responsive media, by inserting the primary subset of static visual objects into the primary media format according to a primary arrangement of the primary subset of static visual objects represented in the feature container in Block S120.

During a second time interval succeeding the first time interval, the method S100 includes: serving a first primary responsive media, in the primary set of responsive media, to a first device for playback to a first user responsive to inputs by the first user at the first device in Block S140; serving a second primary responsive media, in the primary set of responsive media, to a second device for playback to a second user responsive to inputs by the second user at the second device in Block S145; deriving a first engagement metric representing interaction by the first user with the first primary responsive media, in the primary set of responsive media in Block S150; and deriving a second engagement metric representing interaction by the second user with the second primary responsive media, in the primary set of responsive media in Block S155.

During a third time interval succeeding the second time interval, the method S100 includes, in response to the first engagement metric exceeding the second engagement metric: generating a secondary set of feature containers distributed within the multi-dimensional feature space representing a secondary set of responsive media, the secondary set of feature containers biased toward a first primary feature container, in the primary set of feature containers, corresponding to the first primary responsive media and away from a second primary feature container, in the primary set of feature containers, corresponding to the second primary responsive media in Block S160; and serving a third secondary responsive media, in the secondary set of responsive media, to a third device for playback to a third user in Block S165.

1.2 Variation: Human-In-the-Loop+Full Automation

Figure 3:
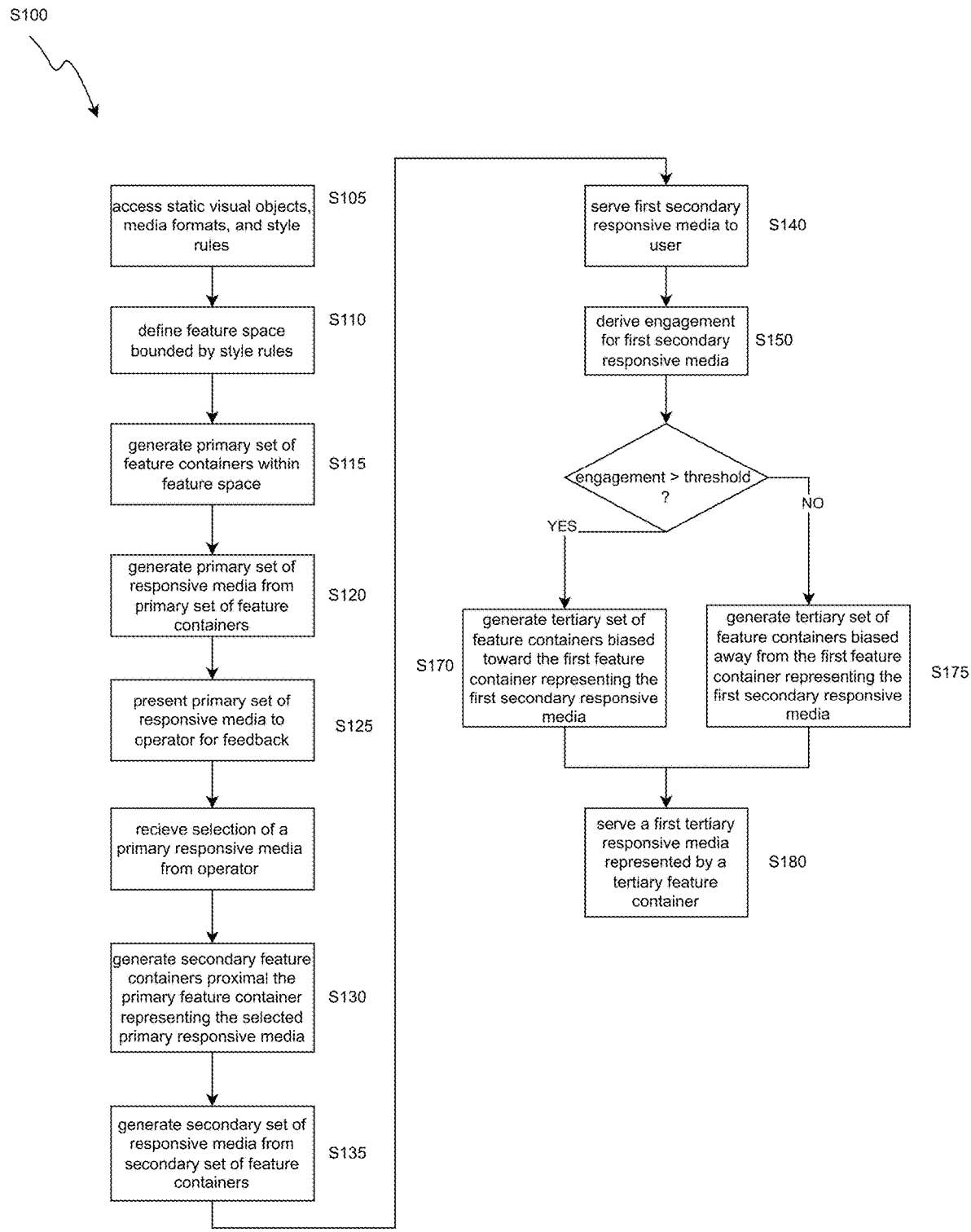
FIG. 3 is a flowchart representation of a variation of the method.

In one variation shown in FIG. 3, the method can include presenting responsive media to the operator and deriving engagement of served responsive media to further refine the responsive media.

This variation of the method S100 includes: accessing a set of static visual objects, a set of style rules, and a set of media formats in Block S105; defining a multi-dimensional feature space representing possible arrangements of combinations of the set of static visual objects within the set of media formats and bounded by the set of style rules in Block S110; and generating a primary set of feature containers distributed within the multi-dimensional feature space in Block S115.

For each feature container, in the primary set of feature containers, the method includes: retrieving a primary subset of static visual objects, in the set of static visual objects, represented in the feature container; retrieving a primary media format, in the set of media formats, represented in the feature container; and generating a primary responsive media, in a primary set of responsive media, by inserting the primary subset of static visual objects into the primary media format according to a primary arrangement of the primary subset of static visual objects represented in the feature container in Block S120.

The method S100 further includes: presenting the primary set of responsive media to an operator in Block S125; and, in response to receiving a first selection of a target primary responsive media, in the primary set of responsive media, generating a secondary set of feature containers distributed within the multi-dimensional feature space proximal a target primary feature container, corresponding to the target primary responsive media in Block S130.

For each feature container, in the secondary set of feature containers, the method includes: retrieving a secondary subset of static visual objects, in the set of static visual objects, represented in the feature container; retrieving a secondary media format, in the set of media formats, represented in the feature container; and generating a secondary responsive media, in a secondary set of responsive media, by inserting the secondary subset of static visual objects into the secondary media format according to a secondary arrangement of the secondary subset of static visual objects represented in the feature container in Block S135.

The method S100 further includes: serving a first secondary responsive media, in the secondary set of responsive media, to a first device for playback to a first user responsive to inputs by the first user at the first device in Block S140; and deriving a first engagement metric representing interaction by the first user with the first secondary responsive media, in the secondary set of responsive media in Block S150.

In response to the first engagement metric exceeding a threshold engagement, the method S100 includes: generating a tertiary set of feature containers within the multi-dimensional feature space and representing a tertiary set of responsive media, the tertiary set of feature containers biased toward a first feature container, in the secondary set of feature containers, corresponding to the first secondary responsive media in Block S110.

In response to the first engagement metric falling below a threshold engagement, the method S100 includes: generating a tertiary set of feature containers within the multi-dimensional feature space and representing a tertiary set of responsive media, the tertiary set of feature containers biased away from a first feature container, in the secondary set of feature containers, corresponding to the first secondary responsive media in Block S175.

Finally, the method S100 includes: serving a responsive media of the tertiary set of responsive media to a second device for playback to a second user responsive to inputs by the second user at the second device in Block S180.

2. Applications

Generally, the method S100 is executed by a computer system to: access a static images, a set of static visual objects (e.g., text, icons, color palettes, style guides), and/or a set of video clips representing a message; and automatically compile subsets of images, visual objects, and/or video clips (or "source media") into a set of different responsive media (e.g., dynamic or interactive media), such as representing a) different responsive media formats defining different user interaction archetypes, b) different combinations of source media, c) different orientations of source media, d) different presentation orders for these media, and/or e) different color and style effects. The computer system can then present this set of responsive media to an operator for feedback; automatically generate a refined set of responsive media based on the operator feedback, such as by generating a second set of responsive media more visually similar to a responsive media confirmed by the operator or more visually dissimilar to a responsive media rejected by the operator. The computer system can then: serve a responsive media in this refined set to an instance of a visual element—inserted into a document accessed on a computing device (e.g., a smartphone, tablet computer, smartwatch, laptop, and/or other mobile computing device)—for viewing and interaction by a user.

More specifically, the computer system can autonomously assemble source media (e.g., text, icons, static images, video clips, style sheets, color histograms, responsive media formats) into an array of responsive medias that communicate a particular message of the source media through a range of text, icon, static image, video clip, style sheet, and/or color histogram combinations presented within responsive media formats defining various media interaction archetypes responsive to a range of user input types, such as swipe, scroll, and click inputs over these responsive medias when rendered on computing devices. The computer system can further: present these responsive medias to an operator via an operator interface executing on a computing device; and refine these responsive media formats based on guidance from the operator, such as by regenerating these responsive medias to exhibit visual and responsive characteristics more similar to a particular responsive media selected by the operator and/or less similar to a particular responsive media rejected by the operator. The computer system can then package these refined responsive medias for distribution to users, such as for insertion into webpages, media streams, or media feeds, etc. viewed on smartphones, tablets, computers, and/or televisions, etc.

Therefore, the computer system can configure a responsive media to respond to user inputs, such as: to cycle forward through a sequence of static images (or "frames" in a video clip) responsive to a downward scroll event over the responsive media, and vice versa; to move or expand select icons, text, or static images within the responsive media response to a downward scroll event over the responsive media, and vice versa; or to cycle forward through a sequence of static images (or "frames" in a video clip) index through a catalog of images or icons, text, and image arrangements responsive to a lateral swipe event over the responsive media; and/or to navigate to a webpage or resource locator responsive to selection of the responsive media; etc. The computer system can further configure a responsive media to detect and return such user interactions (or "user engagement") to the computer system. The computer system can then: aggregate types and frequencies of such user interactions with instances of responsive medias served to a population of users; and again automatically refine these responsive media formats based on guidance from these user interactions, such as by regenerating these responsive medias to exhibit visual and responsive characteristics more similar to a particular responsive media associated with greatest user interaction frequency and/or less similar to a particular responsive media associated with least user interaction frequency.

2.1 Multi-Dimensional Feature Space

Generally, the computer system can: access a set of existing static media including a set of static visual objects; and extract the static visual objects to insert into a new media format to generate a responsive media. For example, the computer system can: access a static image including a set of icons and text boxes in a first static format; extract the set of icons and text boxes from the static image; and insert the icons and text boxes into a media format in multiple configurations to generate a set of responsive media.

In one implementation, the computer system generates a multi-dimensional feature space defining a graphical space including all combinations of arrangements of static visual objects with each media format. The computer system can bound the multi-dimensional feature space based on a set of style rules (e.g., a style guide) to ensure all responsive media generated by the computer system conforms to the set of style rules. Then, the computer system populates the multi-dimensional feature space with a set of feature containers, each arranged at a coordinate within the feature space and representing a combination and arrangement of a set of objects within a media format. The computer system can therefore generate a set of responsive media from the graphical distribution of feature containers.

The computer system can thus automatically generate multiple permutations of a responsive media by combining sets of static visual objects—extracted from existing content—with multiple different media formats and in multiple different arrangements. The computer system can then strategically target combinations of static visual objects and responsive media formats such that the resulting responsive media engages users viewing these interactive advertisements and thus yield successful outcomes (e.g., greater engagement, brand lift, video-completion, click-through, viewability or conversion) than the existing static content.

2.2 Human-In-the-Loop: Operator Guidance

The computer system can: present a set of responsive media to an operator for feedback; and generate a refined set based on the feedback. In particular, the computer system serves a responsive media to the operator and receives an indication of acceptance or rejection of the responsive media from the operator. Based on the operator feedback, the computer system identifies a feature container within the feature space representing the accepted responsive media; and re-populates the feature space with a new set of feature containers arranged proximal the feature container representing the accepted responsive media. Therefore, the computer system can iteratively generate sets of responsive media to converge on a positive operator feedback outcome.

2.2 Autonomous Refined by Population-Wide Engagement

The computer system can: serve a set of responsive media to a set of devices for playback to users of the set of devices; derive an engagement metric of each responsive media; and generate a refined set of responsive media based on served examples of responsive media exhibiting high engagement metrics. In particular, the computer system evaluates a set of served responsive media to detect a responsive media exhibiting the greatest engagement metric of the set of responsive media. The computer system then: identifies a particular feature container associated with the responsive media exhibiting the greatest engagement metric; re-populates the feature space with a set of feature containers proximal the feature container of the high-engagement responsive media; and generates a new or refined set of responsive medias according to these new feature containers.

Therefore, the computer system can iteratively generate sets of responsive media to converge on an increased overall engagement for the set of responsive media based on explicit operator guidance followed by implied guidance derived from engagement with these responsive medias across a population of users.

The method S100 as described herein is executed by a remote computer system to transform static objects into responsive media that is responsive to an additional input mode (e.g., a scroll event that moves the interactive visual ad vertically within a window rendered on a display of a computing device) and that can be tracked to estimate user engagement with greater accuracy and resolution. However, the method S100 can be implemented to generate and serve any other type of visual content in response to any other interactive input (e.g., a scroll or scroll-like input), such as horizontal scroll events, swipe events that move visual content within the visual element, and/or rotational or actuate gestures applied to a computing device. Furthermore, Blocks of the method S100 can be executed locally and in real-time at a user's computing device to transform a static media into an interactive responsive media that can be immediately displayed for a user.

3. Example

In one example, the computer system can automatically generate responsive media for a user on a social media platform based on existing content (e.g., social media posts, videos, campaigns) associated with the user. First, the computer system prompts the user to provide existing content associated with the user to the computer system. For example, the computer system can request access to a set of drafted content within the user's social media account or the user can select one or more content instances and upload them to the computer system.

The computer system accesses the existing content associated with the user and extracts a set of static visual objects. For example, the computer system can extract captions, icons, images present in the existing content. The computer system can additionally generate a set of style rules based on combinations of arrangements of static visual objects within the previous content. For example, the computer system can detect that the user's style includes a particular typeface and angling textboxes between 10° and 35° offset from a horizontal axis from existing content. The computer system can therefore set a style rule to generate responsive media including: the particular typeface; and angling the text boxes between 10° and 35°.

The computer system can further: detect a subject or theme of images within the existing content (e.g., food, celebrities, art, sports); and generate a style rule to generate content adhering to the subject or theme of the existing content.

The computer system then: generates a first set of responsive media examples (e.g., social media posts including interactive combinations of visual static objects); and presents the set of responsive media examples to the user (e.g., an operator).

The computer system prompts the user to input feedback indicating accepted examples of responsive media (e.g., content the user would post on social media) and rejected examples of responsive media (e.g., content the user would not post on social media). Based on the user's feedback, the computer system generates a second set of responsive media refined to exhibit increased similarity to the accepted examples of responsive media from the first set of responsive media presented to the user. The computer system can additionally refine the second set of responsive media to exhibit a decreased similarity to the rejected examples of responsive media.

The computer system then automatically serves (e.g., publishes, posts) one or more responsive media from the second set of responsive media. In one variation, the computer system can additionally track engagement by users (other than the user to whom the responsive media is associated) of the social media platform and serve additional responsive media exhibiting a similarity to high performing response media (responsive media characterized by a high engagement metric).

Therefore, the computer system can: detect style rules of existing content; automatically generate responsive media for a user within a variety of formats based on existing static or responsive content associated with the user; prompt the user for feedback; and automatically generate refined responsive media based on the user's feedback.

4. Media Serving

In one implementation, the computer system is configured to generate and serve responsive media including: videos, animated images, and sequences of static frames. The responsive media can exhibit animation (e.g., change in appearance or position of an object within the responsive media) in response to user interaction with the responsive media including: scrolling past the responsive media; swiping over the responsive media; or selecting (e.g., clicking on) an object of the responsive media.

The Blocks of the method S100 can be executed by a computer system hosted on a remote computer system, such as a remote server. In one implementation, the computer system can retrieve or otherwise access a static asset (e.g., a static graphical advertisement and/or a digital video advertisement) from an internal or external database (e.g., a server or local file storage, such as a browser client) in Block S110. The computer system (or a local computer system, as described below) can then transform the static asset into a responsive media, as described below. The computer system can package the responsive media with a visual element that can later be inserted inline within a document (e.g., a webpage or mobile application) and can make the responsive media and visual element package available for download by an operator; or upload the responsive media to another content distribution network.

Later, when a user navigates to a publisher's webpage via a web browser or to a mobile application via a native application (hereinafter an "app") executing on her smartphone, tablet, or other computing device, a web server hosted by the publisher can return content or pointers to content for the webpage (e.g., in Hypertext Markup Language, or "HTML", or a compiled instance of a code language native to a mobile operating system), including formatting for this content and a publisher tag that points the web browser or app to the publisher's computer system (e.g., a network of external cloud servers). The computer system can then implement a selector to select a particular static asset (or ad), execute Blocks of the method S100 to transform the static asset into a responsive media according to a selected responsive media format as described below, and serve the responsive media to the web browser or application. In one implementation, the computer system can return the responsive media directly to the web browser or application.

In the foregoing implementation, the computer system or content delivery network, etc. can return the responsive media in the form of content within an HTML iframe element to the web browser or content within view in the mobile application. The mobile application can then place the iframe element within the webpage or within the window of the app. The visual element can then animate visual content of the responsive media (e.g., seek through frames in the set of frame within the visual element) based on the position of the visual element shown within a window rendered on a display of the user's computing device according to various Blocks of the first method S100.

5. Source Media

Block S105 of the method S100 recites accessing a set of static visual objects. Generally, in Block S105, the computer system can access a set of source media—from which to generate a set of responsive medias presenting a particular message—such as: static visual objects (e.g., text, icons, static images); style rules (or "style sheets"); color rules (e.g., color histograms); and/or video (e.g., video clips, sequences of static image or frames).

In one implementation, the computer system implements methods and techniques described in U.S. patent application Ser. No. 15/872,688 to: access an existing static asset; and to extract source media from this static access. For example, the computer system can implement computer vision and machine learning techniques to automatically detect and label features (or "objects") within the static asset, which the computer system and/or the visual element can then compile into an interactive format as described below.

In this implementation, the computer system can receive a static asset and identify a set of objects, such as text, a set of colors, locations of faces, images, a set of characteristic and/or context tags, etc., through computer vision techniques, such as optical character recognition (or "OCR"), natural language processing, label detection techniques, face detection techniques, image attributes extraction techniques, etc. The static asset (e.g., a 300-pixel by 250-pixel static advertisement image) can include text blocks, color pallets, images (e.g., images of faces, objects, places), context tags, hyperlinks to external websites, and/or other content related to advertisement of a particular brand and/or product, which the computer system can then identify, label, and extract from the static asset. For example, a static asset advertising a film can include a hero image representing a character from the film, a quote from the character, dates for release of the film in theaters, a location of theaters in which the film will be shown, a link to the film's website, etc. In the foregoing example, the computer system can extract locations and context of each text block, a location of a face of the character, contextual labels representing content depicted in the hero image (e.g., "action film," "post-apocalyptic," "dystopian"), and a histogram of colors represented in the image (e.g., frequency of 35% of Hex Color Code #808080—gray, 25% of Hex Color Code #000000—black, 20% of Hex Color Code #FF0000—red, 10% Hex Color Code #CoCoCo—silver).

In one variation, the computer system can implement OCR techniques to detect text and delineate text blocks by size, color, typeface, formatting, and/or location within the static asset. Then the computer system can extract these discrete text blocks from the static asset. For example, the computer system can differentiate between a text block corresponding to a brand logo, a text block representing a coupon code, and a text block representing a brand slogan despite juxtaposition of the three text blocks and extract these text blocks separately from the static asset.

Alternatively, the computer system can serve the static asset to a third-party feature extractor configured to read in the static asset, extract a set of objects (e.g., colors, text blocks, context tags, and/or other characteristics of the responsive media content) from the static asset by implementing computer vision, and serve the set of objects to the computer system.

However, the computer system and/or any other third-party platform can extract objects from the static asset by implementing any other method or technique in any other suitable way.

In this implementation, the computer system can extract the set of objects from a static asset and store the set of objects within a feature database. For example, the computer system can: categorize objects of the set of objects by object type (e.g. text, icons, images); and store objects of the same object type within a category of the feature database. The computer system then generates a multi-dimensional feature space defining a graphical representation of the objects within the feature database. The computer system can generate axes within the multi-dimensional feature space representing an object type within the feature database. For example, for a text object type, the computer system generates axes representing text size, typeface, and orientation of the text within a frame.

Alternatively, the computer system can access disparate source media from a source media database or file, such as supplied by the operator. For example, the operator may: retrieve and/or generate text strings, icons, static images, style rules, color rules, and/or videos (e.g., video clips, sequences of static image or frames) for a new responsive media campaign; store these source media in an electronic file; an supply these electronic file to the computer system. The computer system can then: extract these source media from the electronic file; characterize these source media; and generate a multi-dimensional feature space that represents features of these source media (and available responsive media formats), as described below.

6. Feature Space and Feature Containers

Figure 4:
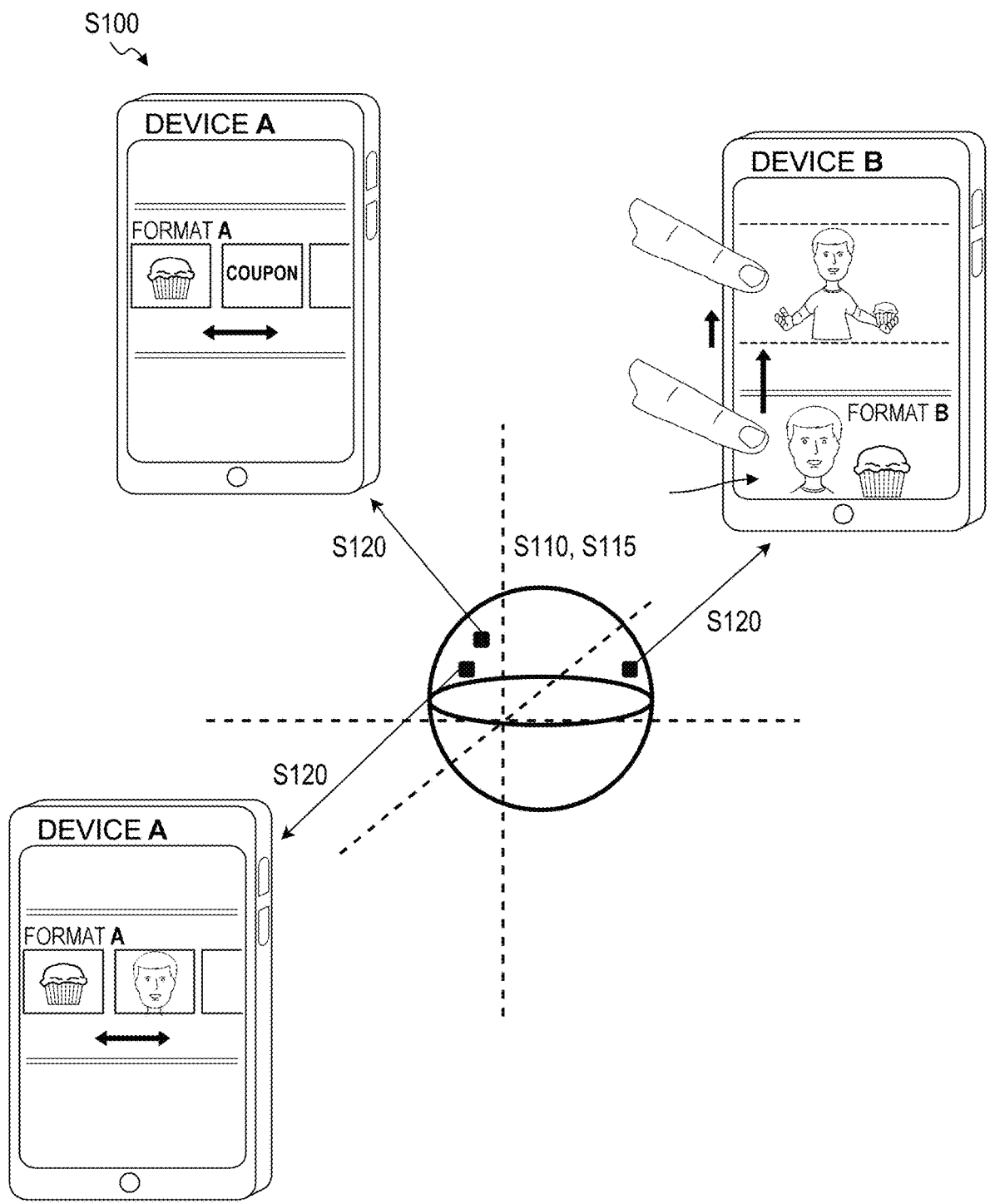
FIG. 4 is a schematic representation of a variation of the method.

The computer system defines the multi-dimensional feature space to represent possible arrangements of combinations of extracted static visual objects, shown in FIG. 4. The multi-dimensional feature space includes an axis for each characteristic of each object type (e.g., size, typeface, and orientation for a text object type) of static visual objects stored within the feature database.

In one implementation, the computer system can: search generic object databases; identify static visual objects exhibiting a similarity to static visual objects stored within the feature database; and add the identified static visual objects to the feature database. Therefore, the computer system can increase a population of static visual objects represented within the multi-dimensional feature space to increase a diversity of possible responsive media.

The computer system defines the multi-dimensional feature space: representing possible arrangements of combinations of the set of static visual objects within the set of responsive media formats; and bounded by the set of style rules. The computer system populates the multi-dimensional feature space with a set of feature containers arranged within a boundary defined by the set of style rules. The computer system can arrange each feature container at a coordinate of the graphical feature space representing an arrangement of a particular combination of objects arranged within a particular media format.

In one implementation, a feature container including a single text object within a media format can define the format [media format, text, text color, text location]. In one example the feature container [3, 2, 5, 1] represents a responsive media including: a media format defined by the $3^{rd}$ index of a media format category of the feature database; a text defined by the $2^{nd}$ index of a text category of the feature database; a text color defined by a $5^{th}$ index of a text color category of the feature database; and a text location defined by a $1^{st}$ index of a text location category of the feature database.

In one implementation, the computer system generates a first set of feature containers distributed within the multi-dimensional feature space in Block S115 by, for each feature container, in the set of feature containers: retrieving a subset of static visual objects, in the set of static visual objects, represented in the feature container; retrieving a responsive media format, in the set of responsive media formats, represented in the feature container; and generating a responsive media by inserting the subset of static visual objects into the responsive media format according to an arrangement of the subset of static visual objects represented in the feature container.

In one implementation, the computer system generates a multi-dimensional feature space defining a representation of the objects within the feature database by pseudo-randomly populating the multi-dimensional feature space with a quantity of vertices. In this example, each vertex in the quantity of vertices: corresponds to a feature container of the primary set of feature containers; and defines a set of coordinates representing a particular media format, a particular static visual object type, a particular static visual object dimension, and a particular static visual object color. The computer system further generates a responsive media from a feature container by: initiating a visual element characterized by the particular media format and including a field for the particular static visual object type; and inserting a static visual object characterized by the particular static visual object type, the particular static visual object dimension, and the particular static visual object color into the field of the visual element.

6.1 Style Rules and Feature Space Boundary

The computer system can define a boundary of the feature space based on a set of style rules. For example, as shown in FIG. 4, the boundary of the feature space can define a spherical volume. The boundary can also define any other multi-dimensional volume to contain a range of possible combinations of arrangements of objects in a responsive media. The computer system therefore only populates feature containers within the boundary of the feature space to generate responsive media conforming to the set of style rules.

In one implementation, the computer system defines the boundary based on a set of style rules by accessing the set of style rules including a set of icon rules defining: a range of icon dimensions; and a range of icon orientations. The computer system therefore defines the multi-dimensional feature space bounded by the set of style rules by: constraining a first axis of the multi-dimensional feature space, corresponding to icon dimension, to a set of dimensions within the range of icon dimensions; and constraining a second axis of the multi-dimensional feature space, corresponding to icon orientation, to a set of orientations within the range of icon orientations. The computer system then defines a set of feature containers and, for each feature container, retrieves a subset of static visual objects, in the set of static visual objects, represented in the feature container by: retrieving an icon of the subset of static visual objects characterized by a first icon dimension, represented by an icon dimension component of the feature container, and defining a value within the range of icon dimensions. Finally, the computer system generates a responsive media from the feature container by: according to an arrangement of the subset of static visual objects represented in the feature container, inserting the icon into the primary media format in a first icon orientation represented by an icon orientation component of the feature container defining a value within the range of icon orientations.

In general, the computer system can receive a set of style rules as an operator input or generate a set of style rules from existing content (e.g., static images, videos, social media posts) provided by the operator. For example, the computer system can access a set of verified responsive media and, for each verified responsive media of the set of verified responsive media: detect a set of characteristics in the verified responsive media; and generate a limit feature container, in a set of limit feature containers in feature space, representing an arrangement of the set of characteristics in the verified responsive media. The computer system then defines the boundary of the multi-dimensional feature space arranged: containing the set of limit feature containers; and outwardly offset by a limit distance from the set of limit feature containers. Therefore, the computer system constrains the feature space within the boundary by deriving a set of style rules from existing content (e.g., static images).

In one implementation, the computer system can receive user input to define a limit distance between verified content feature containers and the boundary. For example, the computer system arranges a verified content feature container within a boundary of the feature space. However, the computer system can define a limit distance between the verified content feature container and the boundary wherein the limit distance corresponds to a variation of possible responsive media beyond the verified content. The computer system thereby prompts a user to select a limit distance wherein: a high limit distance value (e.g., +/−50% of the value of each coordinate of the verified feature container) defines a larger feature space and therefore a higher diversity of possible responsive media; and a low limit distance value (e.g., within +/−5% of the value of each coordinate of the verified feature container) defines a smaller feature space and therefore bounds a set of possible responsive media exhibiting high similarity to the verified content.

For example, the computer system presents a set of limit distances to the operator (e.g., by displaying a slider or dial the operator can move to indicate the limit distance value). In response to selection of a first limit distance in the set of limit distances: the computer system accesses the set of limit feature containers and, for each limit feature container, defines a volume around the limit feature container including a boundary offset from the limit feature by the first limit distance. The computer system then defines the boundary of the multi-dimensional feature space as the union of the volume around each limit feature container.

If no user input is provided, the computer system can define a default limit distance. For example, the default limit distance can define a "conservative value" indicating responsive media generated by the computer system exhibit high similarity to the verified content, such as within 1% variance.

7. Media Formats

A feature container representing a particular responsive media includes: a selection of a media format; and characteristics of a set of static visual objects to be included within the particular responsive media. To generate the particular responsive media, the computer system executes Block S120 of the method S100 to: access the media format indicated by the feature container and defining a layout (e.g., an arrangement) of the set of static visual objects; and insert the set of static visual objects into an instance of the media format according to the layout defined by the media format and the characteristics of the set of static visual objects represented within the feature container.

The computer system can therefore generate responsive media by inserting a set of objects within a responsive media format. The computer system executes Block S120 to transform a set of objects extracted from a static asset into a responsive media according to a media format. In one implementation, the media format defines animation of a set of frames within the visual element responsive to a change of position of the visual element within the window. Generally, the computer system can compile the set of objects extracted from the static asset into a responsive media of a predefined format selected to respond to user interactions with the visual element and effectively engage users with responsive media content.

In particular, the computer system can assemble the set of objects into a responsive media according to a predefined media format selected by the computer system according to a responsive media formatting rules engine. In one implementation, the responsive media formatting rules engine, which can be hosted by the computer system and/or locally at the computing device on which the responsive media is rendered, can define a set of rules governing selection of an appropriate responsive media format for the static asset, types of objects to include within the responsive media, transformations (or transmutations) of objects extracted from the static asset into the responsive media, formatting and layout of the responsive media, etc.

7.1 Media Format Selection

The computer system can select a media format into which the computer system can compile the set of objects (and/or other characteristics of the static asset) according to the responsive media formatting rules engine based on criteria such as: prior user engagement with instances (e.g., social media posts, ads) of the media format (as described below); a number of objects or concentration of features within the static asset; and particular characteristics (e.g., type, context, distribution of objects, etc.) of the static asset. The responsive media formatting rules engine can define a set of media formats characterized by a particular quantity of frames in the set of frames, a particular layout of objects extracted from the static asset within each frame, particular types of objects to be rendered within each frame, a particular order of the frames, and/or animations dictating how frames in the set of frames are rendered within the visual element.

In one implementation, the computer system can select a predefined media format based on a number of objects extracted from the static asset. For example, in response to a number of objects in the set of objects exceeding a threshold number of objects (e.g., ten objects), the computer system can generate a single frame which includes all or a subset of objects in the set of objects (as defined in a first media format). The computer system can then render the single frame in the visual element according to an animation defined by the first media format in response to a scroll event over the visual element. However, in response to the number of objects in the set of objects exceeding the threshold number of objects, the computer system can generate a set of frames, each frame in the set of frames including objects in the set of objects (as defined in a second media format). The computer system can then sequentially render each frame in the set of frames—in response to a scroll event over the visual element—according to an order defined for the set of frames by the second media format.

In another implementation, the computer system can select a media format based on types of objects within the set of objects. Generally, some media formats can more effectively communicate certain types of objects than other media formats. Therefore, the computer system can select media formats to communicate content of the original static asset and yield high levels of user engagement. In one example, the computer system can detect four or more text blocks within a static asset. For this static asset, the computer system can select a responsive media format including four or more frames, each frame including a text block from the static asset. In this example, the visual element indexes through frames in the set of frames at a rate proportional to a scroll-rate of a scroll-event that moves the visual element vertically within a window of the computing device. In this example, the visual element can segment a height of the window (less a height of the visual element) into a number of discrete vertical position ranges equal to the number of frames in the set of frames selected and assign each discrete vertical position range to one frame in the set of frames. Therefore, the visual element can render frames of the responsive media at a frame rate proportional to a rate of scroll-events that move the visual element within the window, mimicking video playback during scroll events.

In another example, the computer system can detect a static asset that contains three or more discrete (and delineated) images. Therefore, the computer system can select a media format that includes three (or more) frames, each frame including one discrete image. In this example, the selected media format can define a horizontal carousel of frames; a user may index through frames of the horizontal carousel by applying a horizontal swipe or scroll across the computing device over the visual element.

In another example, the computer system can detect a face and fewer than two discrete text blocks within the static asset. The computer system can select a media format that emphasizes the face: by zooming into the face rendered within the visual element in response to scroll events that move the visual element vertically downward within the window; and by zooming out of the face rendered within the visual element in response to scroll events that move the visual element vertically upward within the window. In this example, the media format can define a single frame into which the image of the static asset (including the face) and the two text blocks are compiled. In response to a scroll event that moves the visual element upward, the visual element can zoom a crop area—centered over a center of the face—out, such that the face is centered within the visual element and reduced in size; in response to a scroll event that moves the visual element downward, the visual element can zoom the crop area in, such that the face is centered within the visual element and enlarged.

In another example, the computer system can detect that the static asset includes a photograph with indistinguishable text. In this example, the computer system can select a media format that accentuates the photograph by: inserting a mask area over the photograph in the visual element; dissolving (i.e., fading out or making transparent) the mask area to reveal the photograph in response to a scroll event that moves the visual element upward within the window; and making opaque (or translucent) the mask area to obscure the photograph in response to a scroll event that moves the visual element downward within the window.

However, the computer system can select a media format according to which the computer system can transform the static asset into a responsive media in any other suitable way based on any other characteristic or quality of objects within the static asset.

7.2 Example Media Format: Vertical Scroll Responsive Media

Figure 6:
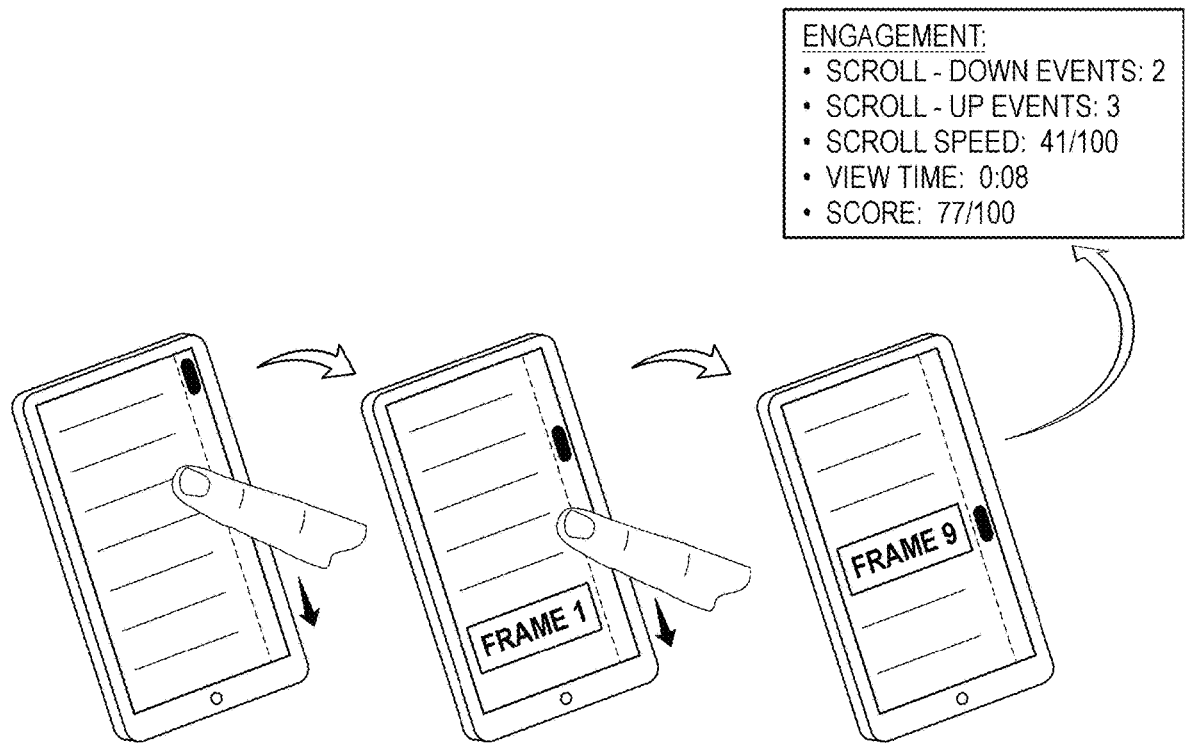
FIG. 6 is a flowchart representation of a variation of the method.

With the visual element thus loaded into a webpage or other document, the visual element then updates content shown within the visual element based on the position of the visual element (e.g., a slot for media content within a webpage) within a window rendered on the computing device. In particular, as the webpage containing the visual element is moved up and down (or left and right) within the window, the visual element indexes through regions of a image, through frames of a video file, or through still images corresponding to objects within the feature container representing the responsive media based on changes to the position of the visual element containing the responsive media relative to the window, such as due to scroll-down and scroll-up inputs entered by the user into the computing device, shown in FIG. 6.

In one implementation, the visual element retrieves a relative position of the visual element within the window from the web browser (or other native application) hosting the webpage or other document in which the responsive media is embedded.

Upon determination or receipt of a new relative position of the visual element within the window, the visual element can preserve a particular region of the static image file (or the current frame in the video file or the current still image) currently loaded into the visual element if the range of vertical positions assigned to the particular region of the static image file contains the new relative position of the visual element. However, if the range of vertical positions assigned to the particular region of the static image file does not contain the new relative position of the visual element, the visual element can replace the particular region of the static image file currently loaded into the visual element with a different region of the static image file (or with a different frame in the video file or with a different still image) assigned a range of vertical positions that does include the new relative position of the visual element within the window.

By repeating this process over time while the webpage containing the visual element is open within the web browser, the visual element can cycle through frames within the responsive media in response to scroll events occurring within the web browser that move the visual element relative to the window rendered on the computing device. Such position-driven updates with the visual element can manifest: as forward playback of a segment of the digital video at a frame rate corresponding to a speed at which the visual element is drawn from a bottom of the window toward the top of the window (i.e., a "scroll-down event"); as a rewind function or reverse playback of the same segment of the digital video at a frame rate corresponding to a speed at which the visual element is drawn from a top of the window toward the bottom of the window (i.e., a "scroll-up event"); and as pausing playback of the segment of the digital video in the absence of a scroll event at the window.

The computer system can additionally generate a vertical scroll responsive media by executing the method described in U.S. Pat. No. 9,852,759.

7.2.1 Vertical Scroll Responsive Media Implementation

In one example, the computer system generates a responsive media in a media format that responds to vertical scrolling on a webpage by a user of a computing device including the visual element.

For example, the computer system executes Block S105 of the method S100 by: accessing a static graphical image depicting a set of visual objects representing responsive media content; and extracting the set of visual objects from the static graphical image.

The computer system executes Block S120 of the method S100 by: retrieving the primary media format including a sequence of frame templates, each frame template in the sequence of frame templates associated with a vertical position of the primary responsive media within a window rendered on a device; initializing a first frame, associated with a first vertical position of the primary responsive media within the window rendered on the device, according to a first template frame in the sequence of frames; retrieving a first static visual object represented in the feature container; inserting the first static visual object into the first frame; retrieving the secondary media format including a second sequence of frame templates, each frame template in the second sequence frame templates associated with a vertical position of the secondary responsive media within a window rendered on the device; initializing a second frame, associated with a second vertical position of the secondary responsive media within the window rendered on the device, according to a second template frame in the sequence of frames; retrieving a second static visual object represented in the feature container; inserting the second static visual object into the second frame; and assembling the first frame and the second frame into the primary responsive media.

The computer system executes Block S125 of the method S100 by: serving the primary responsive media to a first visual element loaded into a window of a first computing device accessed by the operator; in response to a first vertical scroll event that moves the visual element vertically from an initial position to a first position within the window, rendering the first frame, in the primary responsive media, within the window; and in response to a second vertical scroll event that moves the visual element vertically from the first position to the second position within the window, rendering the second frame in the primary responsive media, within the window.

7.3 Example Media Format: Horizontal Scroll Responsive Media

Figure 7:
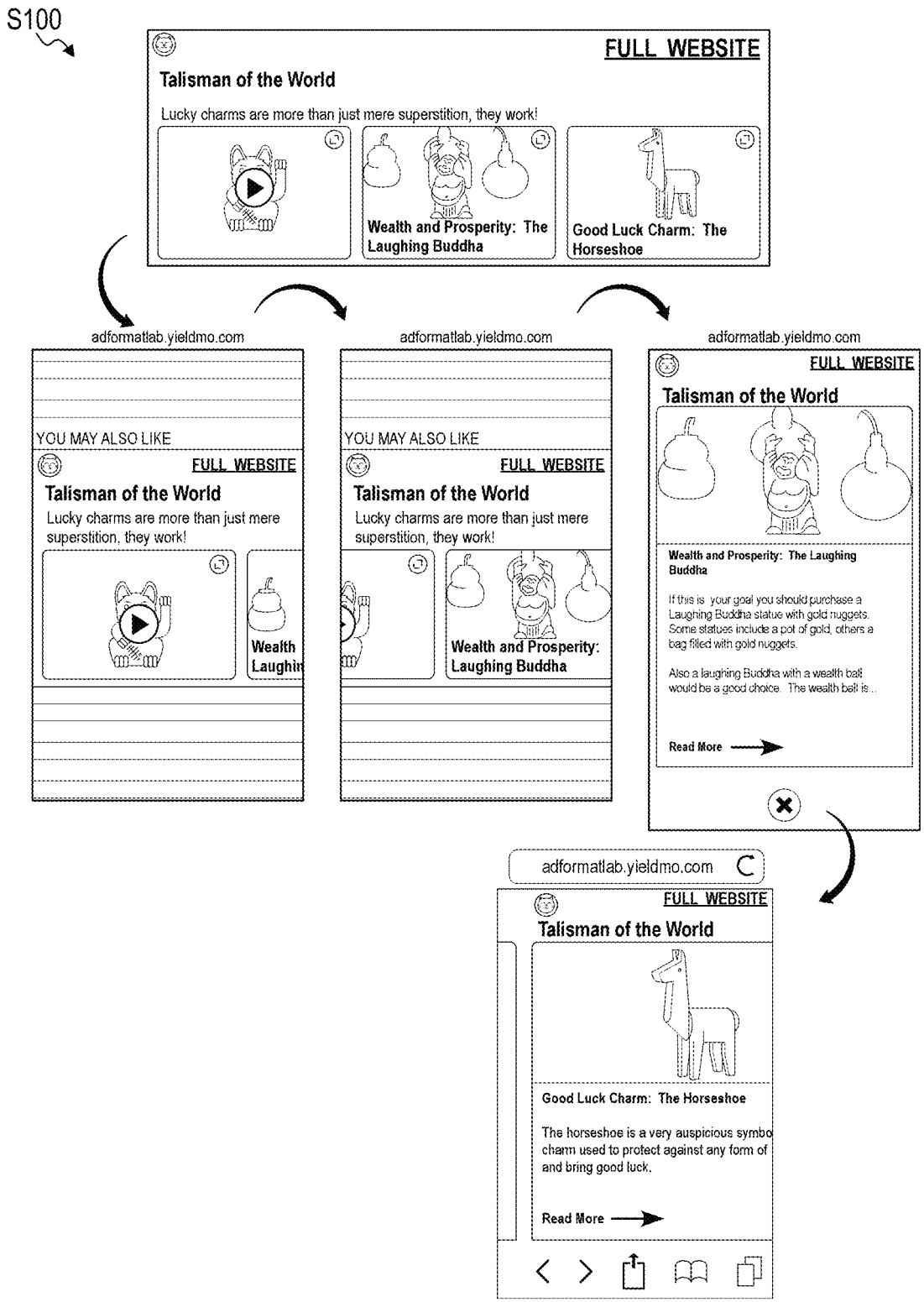
FIG. 7 is a flowchart representation of a variation of the method.

In another implementation, the visual element can compile the set of frames into a horizontal carousel such that the visual element can sequentially index through frames in the horizontal carousel in response to a horizontal scroll event over the visual element that shifts frames in the set of frames horizontally across the window, shown in FIG. 7. In this implementation, the computer system, prior to serving the frames to the visual element, can generate a static image including the subset of frames adjoined in a single row in an order from left to right corresponding to the order of the set of frames. To index through each frame in the horizontal carousel, the visual element can index a mask (or crop) area over discrete regions of the static image at a rate corresponding to a rate of the horizontal scroll event over the visual element. In this implementation, each discrete region of the static image can correspond to a frame in the set of frames. The visual element can then render contents of the static image bounded by the mask area in response to each horizontal scroll event that shifts the static image horizontally within the visual element and across the window.

However, the visual element can implement any other method or technique to sequentially load frames selected during scroll-down events, scroll-up events, and/or horizontal scroll events occurring at the computing device.

The computer system can additionally generate a horizontal scroll responsive media by executing the method described in U.S. Pat. No. 11,042,906.

7.3.1 Horizontal Scroll Responsive Media Implementation

In one example, the computer system generates a responsive media in a media format that responds to horizontal scrolling or swiping on a webpage by a user of a computing device including the visual element.

For example, the computer system executes Block S105 of the method S100 by: accessing a static graphical image depicting a set of visual objects representing responsive media content; and extracting the set of visual objects from the static graphical image.

The computer system executes Block S120 of the method S100 by: retrieving the primary media format including a sequence of frame templates, each frame template in the sequence of frame templates associated with a horizontal position of the primary responsive media within a window rendered on a device; initializing a first frame, associated with a first horizontal position of the primary responsive media within the window rendered on the device, according to a first template frame in the sequence of frames; retrieving a first static visual object represented in the feature container; inserting the first static visual object into the first frame; initializing a second frame, associated with a second vertical position of the secondary responsive media within the window rendered on the device, according to a second template frame in the sequence of frames; retrieving a second static visual object represented in the feature container; inserting the second static visual object into the second frame; and assembling the first frame and the second frame into the primary responsive media.

The computer system executes Block S125 of the method S100 by: serving the primary responsive media to a first visual element loaded into a window of a first computing device accessed by the operator; in response to a first horizontal scroll event that moves the visual element horizontally from an initial position to a first position within the window, rendering the first frame including the first static visual object, in the primary responsive media, within the window; and in response to a second horizontal scroll event that moves the visual element horizontally from the first position to the second position within the window, rendering the second frame including the second static visual object in the primary responsive media, within the window.

7.4 Example Media Format: Scroll-Responsive Layered Objects

Figure 8:
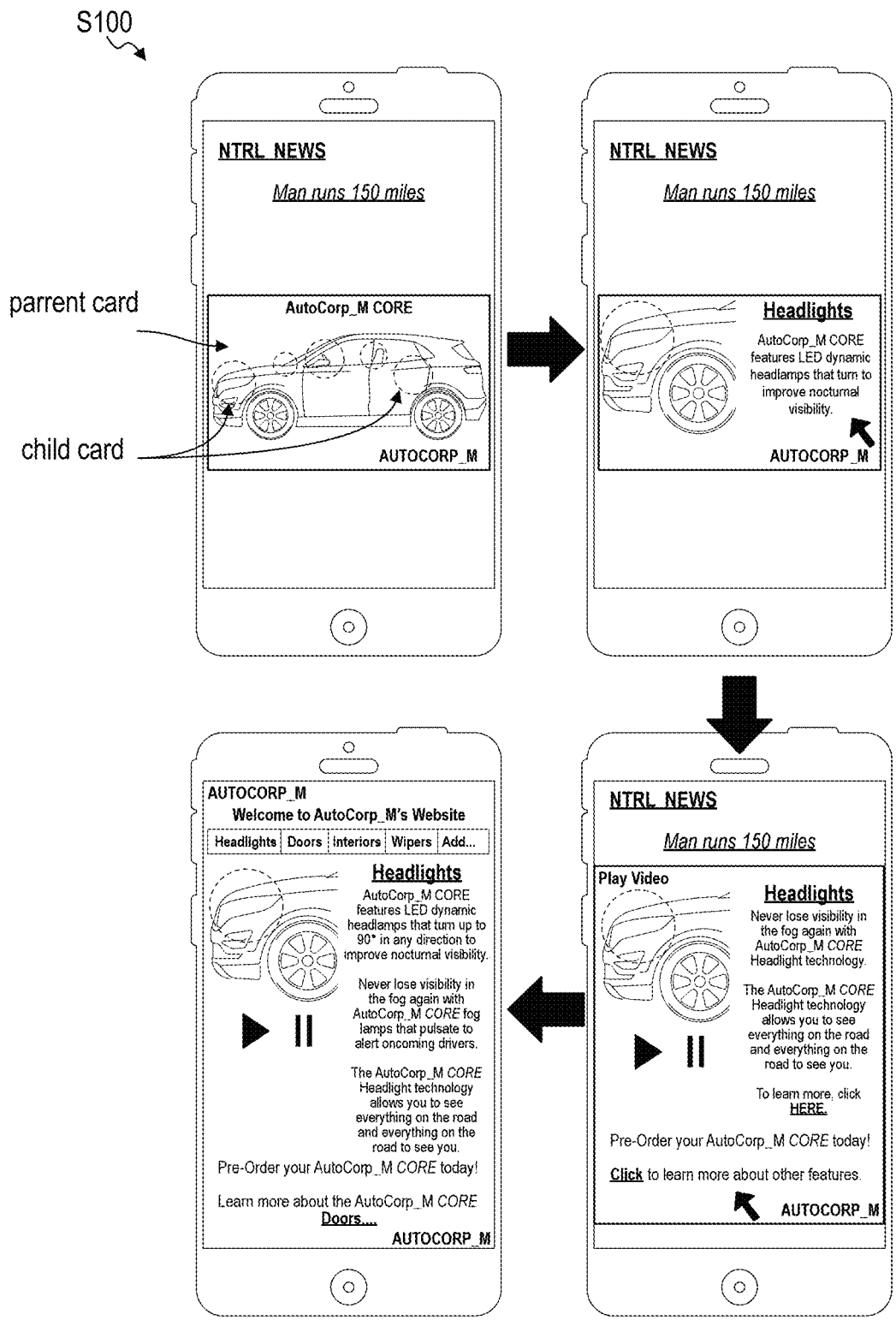
FIG. 8 is a flowchart representation of a variation of the method.

In one implementation of the method S100, the computer system inserts a set of objects defined by a feature container into a layered media format, as shown in FIG. 8. The layered media format can include a set of objects that, in response to user interaction such as scrolling, are modified based on the interaction. For example, the computer system can: insert a set of objects into the layered media format; present the responsive media within a visual element of a webpage; and, in response to a scroll event, enlarge or highlight an object in the set of objects.

For example, the computer system can: insert a parent card (e.g., a base layer, background layer, background image) into a visual element; and insert a set of child cards (e.g., icons, foreground images) into the parent card, wherein each child card includes a hero image and a link to a related external document. Generally, the computer system functions to generate a visual element that contains multiple objects (e.g., a set of objects defined in the feature container)—related to a common theme—in multiple discrete information density tiers.

A parent card can define a container for child cards and a lowest information density tier. The parent card can include a parent hero image, such as a background image or an image of a primary icon (e.g., a brand icon). The parent card can also contain a title and/or a general abstract. The parent card can further contain a link to external content, such as a link to a webpage associated with a publisher of the responsive media.

The parent card can span the width and/or height of the visual element to define a static background image or color over which child cards are inserted and can include a direct link to external content.

A child card defines a second tier of information density. In particular, a child card can include a section title and a hero image for one discrete subtheme, section, chapter, episode, member, or division, etc. within the global theme of the parent card. For example, a child card can include an image and a body of text less than a particular character length (e.g., a short body of text extracted from a section of a webpage associated with the parent card).

The computer system can thus generate a set of (e.g., two or more) child cards per parent card and can insert each child card into one carousel position within a virtual horizontal card carousel—over or wrapped by the parent card—in the visual element. For example, for a set of child cards containing content extracted from an ordered sequence of subthemes, sections, chapters, episodes, members, or divisions, etc., the computer system can insert these child cards in order into carousel positions within the virtual horizontal card carousel. In particular, the visual element can render each child card—including its hero image and section title—in one carousel position to form a single row of child cards that can be scrolled through laterally within the visual element. The set of child cards can be ordered according to a contiguous narrative or storyline related to and portraying the parent card's global theme in a logical and sequential series.

In one implementation, the layered responsive media including the parent card and set of child cards indexes through the set of child cards in response to the swipe input between a first time and a second time. Generally, the visual element is configured to index or scroll through the set of child cards in response to an input, such as a swipe, nonparallel to a scroll axis of the window, and over the visual element.

The visual element can render the set of child cards such that the height of each child card, in the set of child cards, is less than the height of the visual element and less than the height of the parent card rendered in the visual element. Thus, at a given time, the visual element can render one or more child cards over the parent card. For example, at a first time, the visual element can render the parent card, a first child card over the parent card at a central position, and a portion of a second child card over the parent card adjacent the first child card. At a second time succeeding the first time, in response to a swipe event, the visual element can index to the second card, thereby rendering a portion of the first card adjacent (e.g., to the left of) the second card, the second card in its entirety in the central position, and a portion of a third card opposite (e.g., to the right of) the second card.

The computer system can additionally generate a layered responsive media including a parent card and set of child cards by executing the method described in U.S. Pat. No. 11,042,906.

7.4.1 Layered Responsive Media Implementation

In one example, the computer system generates a responsive media in a layered media format that responds to scrolling on a webpage by a user of a computing device including the visual element.

For example, the computer system executes Block S105 of the method S100 by: accessing a background image; accessing a set of icons; and accessing a set of hyperlinks corresponding to the set of icons.

The computer system executes Block S120 of the method S100 by: retrieving the primary media format; generating the primary responsive media by embedding a hyperlink within each icon; and inserting the set of icons overlaid on the background image into the primary media format.

The computer system executes Block S125 of the method by: serving the primary responsive media to a first visual element loaded into a window of a first computing device accessed by the operator; in response to a first swipe input, entered by the operator at the first computing device, over the visual element, indexing through the set of icons rendered over the background image within the visual element; in response to selection of a first icon, in the set of icons, within the visual element triggering the computing device to open an expanded window over the electronic document, rendering expanded variants of icons, in the set of icons, within the expanded window; in response to a second swipe input over the expanded window, indexing through expanded variants of the set of icons rendered within the expanded window; and, in response to selection of a first expanded variant of a first icon, in the set of icons, within the expanded window, the first icon including a first link, triggering the computing device to navigate to a first external document associated with the first icon based on the first link.

7.5 Example Media Format: Masking Background Images

Figure 9:
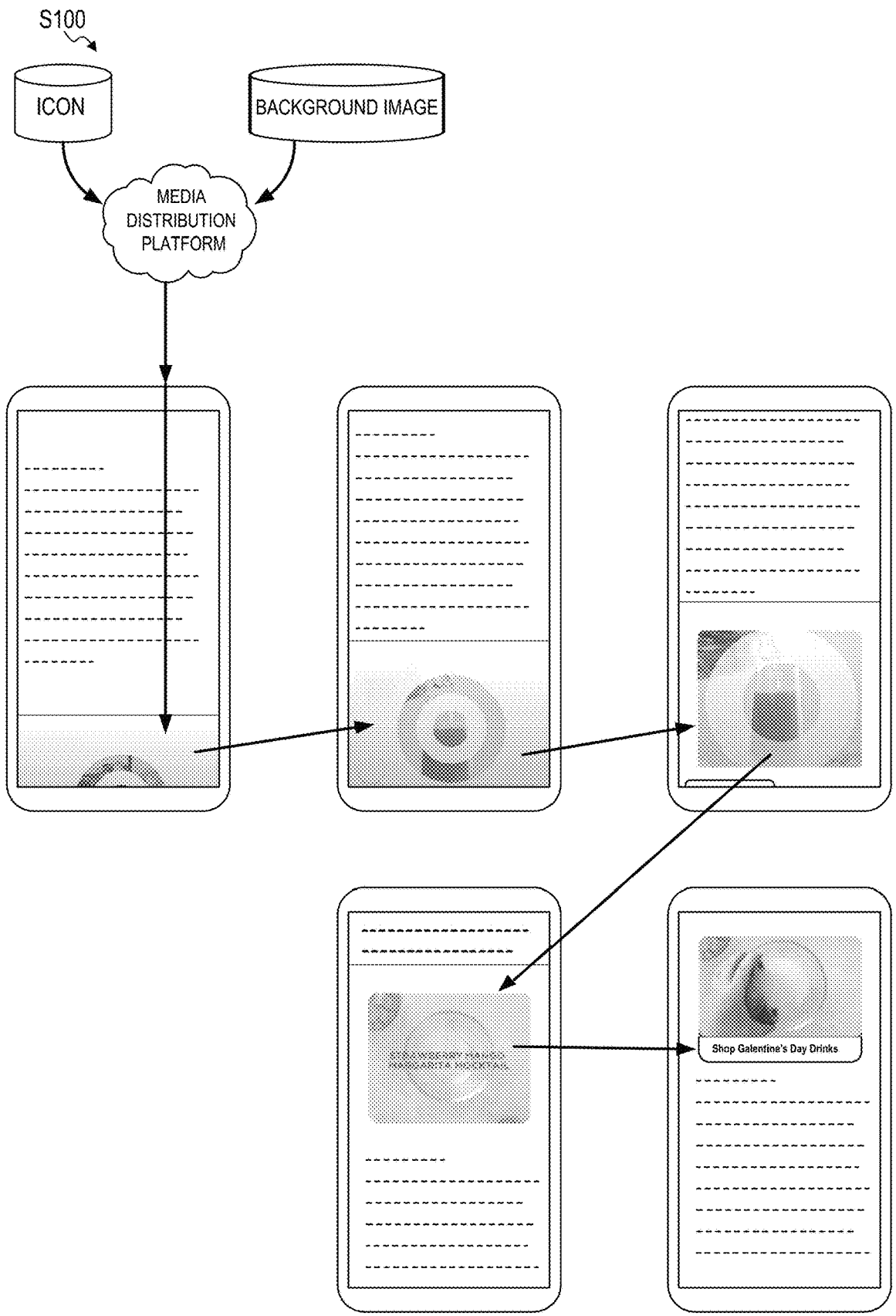
FIG. 9 is a flowchart representation of a variation of the method.

The computer system can additionally generate responsive media in another layered media format including a mask overlaid on a background image, shown in FIG. 9.

In one implementation, the mask defines a responsive transformation defining a sequence of transformations linked to a sequence of (vertical) positions of the visual element within a window of a computing device. In this implementation, the mask can define a first sequence of transformations responsive to a scroll-down event (e.g., that moves the visual toward a top of the window) and a second sequence of transformations responsive to a scroll-up event (e.g., that moves the visual toward a bottom of the window).

For example, the mask can define a responsive transformation defining a sequence of transformations, each transformation in the sequence of transformations expanding a size of an aperture within the mask responsive to the user scrolling down within the webpage, thereby moving the visual element up within the window. Upon insertion of the responsive media including the mask and the background image at the visual element loaded in a webpage of a computing device associated with a user, the visual element can: overlay the background image with the mask such that a first region of the background image exhibiting a first area is bounded by an aperture of the mask; and, in response to a first scroll event that moves the visual element from an initial location outside a window of the computing device to a first location within the window, render the mask over the background image such that a user viewing the responsive media may see the first region of the background image bounded by the aperture. Then, in response to a second scroll event that moves the visual element to a second location above the first location within the window, the visual element can: expand the aperture according to a first transformation, in the sequence of transformations, linked to the second location, such that a second region (e.g., including the first region) of the background image is bounded by the aperture, the second region exhibiting a second area greater than the first area. As the user continues scrolling and the visual element continues moving toward a top of the window, the visual element can continue expanding the aperture (e.g., until the complete background image is revealed) according to the sequence of transformations (e.g., a second transformation linked to a third location, a third transformation linked to a fourth location, etc.).

Thus, as the user scrolls down a webpage (e.g., a scroll-down event) and the visual element moves toward a top of the window, the visual element can transform the mask according to the sequence of transformations (or "first sequence of transformations") to enlarge the aperture and reveal the full background image responsive to user scrolls. Therefore, the visual element can transform the mask (e.g., by increasing a size of the aperture) as the user scrolls down the webpage to reduce an amount of the background image obscured by the mask. However, if the user begins to scroll back up the webpage such that the visual element moves toward a bottom of the window (e.g., a scroll-up event), the visual element can transform the mask according to a second sequence of transformations. The visual element can modify the mask according to the second sequence of transformations to reverse the first sequence of transformations, such that the aperture shrinks as the user scrolls up, each transformation in the second sequence equal and opposite a corresponding transformation in the first sequence, thereby increasing an amount of the background image obscured by the mask. Alternatively, the visual element can maintain rendering of the "complete" background image in the visual element once the first sequence of transformations is complete, such that a user may continue viewing a full version of a static or video background image or click on a call-to-action rendered adjacent the background image.

The computer system can additionally generate a responsive media including a masked background image by executing the method described in U.S. Pat. No. 11,244,103.

7.5.1 Masking Background Images Implementation

In one example, the computer system can generate a responsive media including an icon (e.g., the mask, static object) overlaid on a background image and partially obscuring the background image.

For example, the computer system can execute Block S105 of the method S100, by: accessing a background image; and accessing an icon associated with the background image.

The computer system can execute Block S120 of the method S100, by: retrieving the primary media format including a background layer and an overlaid window layer; inserting the background image into the background layer; and inserting the icon into the overlaid window layer, the icon arranged overlaid on the background image, including a base layer defining a first opacity and including an aperture defining a second opacity less than the first opacity and an outline associated with the background image and configured to reveal a proportion of the background image linked to a vertical position of the visual element within the window.

The computer system executes Block 8125 of the method S100 by: serving the primary responsive media to a first visual element loaded into a window of a first computing device accessed by the operator; at the visual element loaded, in response to an initial scroll event, entered by the user at the computing device, that moves the visual element to a first vertical position within the window, rendering the background image within the visual element and rendering the icon over the background image, the aperture revealing a first proportion of the background image; and, in response to a first scroll-down event that moves the visual element toward a second vertical position above the first vertical position within the window, transforming the aperture at a rate corresponding to a scroll rate of the first scroll-down event to reveal an increasing proportion of the background image.

8. Operator Feedback

The computer system can generate a set of responsive media for a set of feature containers distributed within the feature space and present the set of responsive media to an operator (e.g., a stakeholder in the responsive media such as the user the computer system generates a set of responsive social media content for) for feedback on the responsive media.

The computer system can prompt the operator to provide feedback such as by: rendering each responsive media in the set of responsive media to the operator; rendering an "accept" button proximal each responsive media; rendering a "reject" button proximal each responsive media; and receiving operator input in the form of interaction with each "accept" and "reject" button. For example, the computer system can present a set of five responsive media to the operator and render "accept" and "reject" buttons proximal each responsive media. In response to the operator selecting "accept" for a first and second responsive media of the set and "reject" for the third, fourth, and fifth responsive media of the set, the computer system can generate a refined set of responsive media exhibiting a similarity (e.g., including the same objects, colors, text, and/or media format) to the first and second responsive media. The computer system can additionally generate the refined set of responsive media to exhibit a dissimilarity (e.g., including different objects, colors, text, and/or media format) to the third, fourth, and fifth responsive media.

In one implementation, the computer system can prompt the operator to arrange the set of responsive media in a ranked list or otherwise indicate a preference for a responsive media out of the set of responsive media.

The computer system generates a refined set of responsive media based on the operator feedback. For example, in response to receiving a selection of a responsive media, the computer system generates a second set of feature containers distributed within the multi-dimensional feature space proximal a target feature container, corresponding to the selected responsive media. Then, for each feature container, the computer system: retrieves a subset of static visual objects, represented in the feature container; retrieves a responsive media format represented in the feature container; and generates a second responsive media, by inserting the subset of static visual objects into the responsive media format according to an arrangement of the subset of static visual objects represented in the feature container. The computer system serves the second responsive media to a first device for playback to a first user responsive to inputs by the first user at the first device.

In another example, the computer system can: receive the first selection of a first responsive media, the first selection indicating acceptance of a first arrangement of a first combination of a subset of static visual objects in the first primary responsive media; and receive a second selection of a second responsive media, the second selection indicating rejection of a second arrangement of a second combination of the subset of static visual objects in the second primary responsive media. The computer system then generates the secondary set of feature containers, representing a refined set of responsive media, distributed within the multi-dimensional feature space and biased: toward the first feature container corresponding to the first responsive media and away from a second feature container corresponding to the second responsive media. Therefore, in response to operator acceptance of a presented responsive media, the computer system can generate a similar responsive media by populating a feature container biased toward the feature container of the accepted responsive media and biased away from the feature container of the rejected responsive media, thereby refining the responsive media to resemble elements of the accepted responsive media.

8.1 Operator Feedback: Regeneration of Responsive Media

In one implementation, the computer system can present the set of responsive media to the operator and render a button or other interactive element configured to discard the current set of responsive media presented to the operator and present a new set of responsive media. In response to the operator selecting the button or other interactive element, the computer system generates and presents the new set of responsive media. Therefore, an operator can view several sets of responsive media to determine an approved or rejected responsive media.

For example, in response to receiving a discard instruction from the operator for a primary set of responsive media, the computer system generates a replacement set of feature containers: distributed within the multi-dimensional feature space; and defining different feature containers than the primary set of feature containers. Then, for each feature container, in the replacement set of feature containers, the computer system: retrieves a primary subset of static visual objects represented in the feature container; retrieves a primary media format represented in the feature container; and generates a primary responsive media, in a replacement set of responsive media, by inserting the primary subset of static visual objects into the primary media format according to an arrangement of the primary subset of static visual objects represented in the feature container. Finally, the computer system presents the replacement set of responsive media to the operator.

8.2 Operator Feedback: Approved Features

In one implementation, the computer system can present an interactive element for each object of a responsive media, the interactive element including a field for the operator to "accept" or "reject" the object or a characteristic of the object. For example, the computer system can present an "accept" or "reject" element associated with a text box within the responsive media. The operator can choose to "reject" the text box, indicating a refined version of the responsive media to include a different text box, but "accept" the overall responsive media for the computer system to generate a similar refined responsive media including a different text box.

For example, the operator can "reject" a media format of the responsive media. The computer system presents a first responsive media defining a first feature container including: a first subset of static visual objects; and a first format. The computer system can then generate a refined feature container distributed within the multi-dimensional feature space proximal the first feature container, corresponding to the first responsive media wherein the refined feature container: defines the first subset of static visual objects; defines a second format; and represents the refined responsive media.

8.3 Operator Feedback: Remove from Boundary

In one implementation, the computer system can, in response to an operator rejecting a responsive media, redefine the boundary of the feature space to remove the feature container representing the responsive media from the boundary. Therefore, in response to the operator's rejection of a responsive media, the computer system moves the boundary of the feature space to constrain the set of possible arrangements of combinations of objects within a responsive media.

9. Engagement

Generally, after serving the responsive media to a visual element embedded within a webpage accessed by a user of a computing device in Block S140, the computer system executes Block S150 to derive an engagement metric for the responsive media. The engagement metric indicates interaction by the user with the responsive media including scroll speed, duration viewed, and clicks on the responsive media.

Generally, the visual element can implement methods and techniques described above in the method S100 to characterize user engagement within the visual element and its content based on one or more interactions between the user and the webpage.

In particular, because the visual element updates content shown within the responsive media based on the position of the visual element within a window rendered on a display of a computing device (i.e., in response to scroll-down and scroll-up events at the computing device), the visual element or the computer system can generate metrics for user engagement with the responsive media enabled by user controls integrated into the visual element.

In one implementation, the visual element maintains counts of: a number of scroll-down and scroll-up events occurring at the computing device while all or a portion of the visual element is shown in the window; a number of back-to-back scroll-down and scroll-up event pairs; a number of discrete scroll events at scroll speeds less than a threshold scroll speed or within a scroll speed range corresponding to historical peak user engagement; a number of times the visual element enters and exits the window; a maximum duration the responsive media within the visual element remains continuously within the window; and/or a total duration the responsive media is shown within the visual element during a single access to the webpage containing the visual element at the computing device; etc. The visual element can also track: a duration of time that the visual element is shown within the window while the webpage or other document is accessed at the computing device; and a click-through event, including whether the user selected the responsive media to navigate to an out-of-line video player or to another destination URL stored in the visual element metadata, as described above. For example, in addition to metrics described above, the visual element can append an engagement metric for the instance of the visual element loaded into the webpage with a total duration of the responsive media represented by frames remaining within view in the window before navigation to an alternate webpage or closure of the web browser at the computing device.

The visual element can also calculate an interaction quality for the instance of the responsive media. For example, the visual element can classify user interaction with the responsive media as: "no engagement" if the user rapidly (e.g., faster than a threshold speed) scrolls the visual element from the bottom of the window to the top of the window and does not revisit the visual element; "limited engagement" if less than 50% of the frames are rendered within the visual element; "moderate engagement" if the user slowly scrolls the visual element into the window and if 50-75% of the frames are rendered within the visual element; "good engagement" if the user scrolls up and then scrolls down once with the visual element within the window and if 75-100% of the frames are rendered within the visual element or within a native video player; and "excellent engagement" if the user scrolls up and scrolls down more than once following entry of the visual element into the window and 100% of the of the frames are rendered within the visual element or within the native video player. However, the visual element can implement any other method or technique to characterize user interactions with the visual element and its content.

In one variation, the visual element can calculate the engagement metric based on interactions relevant to a media format of the responsive media evaluated by the engagement metric. For example, for a multiple frame responsive media in which a user applies an input to a computing device to index through frames horizontally, the visual element can calculate the engagement metric based on a number of horizontal scroll events and a number of frames rendered—in full—in the visual element. For a multiple frame responsive media in which a user applies an input to a computing device to index through frames vertically in response to scroll-up and scroll-down events, the visual element can calculate the engagement metric based on a number of scroll-up events, a number of scroll-down events, and a rate (e.g., average rate) of the scroll-up and scroll down-events. (A user who scrolls quickly through the frames may not completely view content in full.) For a single frame responsive media in which a user applies an input to animate the responsive media in the visual element, the visual element can calculate the engagement metric based on a number of vertical scroll events and/or changes in direction of the scroll events. Generally, the visual element can base the engagement metric on interactive events that account for variation in the methods in which visual content rendered in the visual element is animated to supply an accurate representation of how each responsive media engages (or fails to engage) users.

The visual element can then package any one or more of the user engagement metrics and return these user metric data to the publisher or other entity. Alternatively, the visual element can return raw interaction data (e.g., scroll event counts) as described above to the computer system, and the computer system can implement similar methods and techniques to transform these raw interaction data into one or more user engagement metrics and to then serve these engagement metrics to one or more external entities.

However, the visual element and/or the computer system can generate and handle user engagement metrics of any other type in any other suitable way.

9.1 Engagement-Based Responsive Media Generation

The computer system can generate a refined set of responsive media in response to engagement with a served responsive media. For example, the computer system can: serve a first responsive media to a first user; and serve a second responsive media to a second user. Then, the computer system: derives a first engagement metric representing interaction by the first user with the first responsive media; and derives a second engagement metric representing interaction by the second user with the second responsive media.

For example, in response to the first engagement metric exceeding the second engagement metric (e.g., the first responsive media exhibiting a higher view duration than the second responsive media), the computer system discards the second responsive media, such as by deleting the feature container from the multi-dimensional feature space or constraining the boundary of the feature to omit the feature container representing the second responsive media. The computer system can then serve the first responsive media to a third user for playback on a third device.

Therefore, in response to a first responsive media exhibiting a high engagement metric or an engagement metric above a second responsive media, the computer system can serve the first responsive media to another user to increase overall engagement with the set of responsive media.

In one implementation, the computer system can: serve an initial set of responsive media; derive engagement metrics for each initial responsive media; and generate a new set of responsive media similar to initial responsive media exhibiting a high engagement metric (e.g., an engagement metric above a target engagement value).

For example, the computer system can serve a first responsive media to a first user at a first device; serve a second responsive media to a second user at a second device; and derive engagement metrics for the first and second responsive media. In response to the first engagement metric exceeding the second engagement metric, the computer system can: generate a tertiary set of feature containers within the multi-dimensional feature space and representing a tertiary set of responsive media, the tertiary set of feature containers biased toward a first feature container corresponding to the first responsive media and away from a second feature container corresponding to the second responsive media. The computer system then serves a tertiary responsive media to a third user at a third device.

In one implementation, for a responsive media exhibiting an engagement metric below a minimum engagement threshold, the computer system can remove the feature container representing the responsive media from the boundary of the feature space by redefining the boundary. The computer system can therefore prevent generating and serving instances of low performing responsive media once a low performing responsive media is identified.

For example, the computer system derives an engagement metric representing interaction by a user with the responsive media. In response to the engagement metric falling below a minimum engagement metric threshold, the computer system: constrains the boundary of the multi-dimensional feature space to omit the feature container corresponding to the responsive media to remove an arrangement of a combination of a subset of static visual objects represented in the feature container.

The computer system can thereby generate a set of responsive media similar to (e.g., defining a feature container proximal to) a first responsive media exhibiting a high engagement metric and different from (e.g., defining a feature container distal from) a second responsive media exhibiting a lower engagement metric than the first responsive media. Therefore, the computer system iteratively generates sets of responsive media to converge on an increased engagement metric.

9.2 Context-Based Responsive Media Generation

In one variation, the computer system can further refine responsive media based on contextual data of user interactions.

In this variation, the computer system serves a set of responsive media to a population of users via a population of devices. For each responsive media a visual element: renders the responsive media; collects user interaction (e.g., engagement) data and contextual data including an operating system of the device, a device type, a time of day, a connection type (e.g., Wi-Fi vs cellular data), a geographic location of the device, a page URL, and/or a category of the content of the responsive media; and transmits the interaction and contextual data to the computer system.

For each responsive media served to the population of users, the computer system: aggregates the engagement and contextual data; and derives correlations between contextual data and engagement data. For example, for a first responsive media, the computer system identifies a low engagement metric across all types of contextual data (e.g., for all times of day, operating systems, geographic locations etc.). For a second responsive media, the computer system identifies: a high engagement correlated to contextual data including a first operating system, a first geographic location, and a first time of day; and a low engagement correlated to other combinations of contextual data types. For a third responsive media, the computer system identifies: a high engagement correlated to a contextual data including a second operating system; and low engagement correlated to other combinations of contextual data types. For a fourth responsive media, the computer system identifies: a high engagement correlated to contextual data including a second geographic location and a WiFi connection; and low engagement correlated to other combinations of contextual data types.

In this example, the computer system can: generate a second set of responsive media by populating the multi-dimensional feature space with a second set of feature containers proximal the feature container representing the second responsive media; store the second set of responsive media for distribution to devices running the first operating system, located in the first geographic location, and requesting the responsive media within the first time of day; generate a third set of responsive media by populating the multi-dimensional feature space with a third set of feature containers proximal the feature container representing the third responsive media; store the third set of responsive media for distribution to devices running the second operating system; generate a fourth set of responsive media by populating the multi-dimensional feature space with a fourth set of feature containers proximal the feature container representing the fourth responsive media; and store the fourth set of responsive media for distribution to devices in the second geographic location and connected to WiFi.

Therefore, the computer system can refine a first high-engagement responsive media to generate similar responsive media; and serve the similar responsive media to devices exhibiting contextual data approximating the contextual data of the first high-engagement responsive media.

10. CONCLUSION

Blocks of the method S100 and variations thereof described above can be executed by a visual element within a webpage accessed through a web browser, within a mobile or native application, or within any document of any other type accessed via any other application executing on a computing device, such as a smartphone, a smartwatch, a tablet computer, a laptop computer, or a desktop computer, or other computing device.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method comprising:
accessing a set of static visual objects;
accessing a set of style rules;
accessing a set of media formats;
defining a multi-dimensional feature space:
representing possible arrangements of combinations of the set of static visual objects within the set of media formats; and
bounded by the set of style rules;
generating a primary set of feature containers distributed within the multi-dimensional feature space;
for each feature container, in the primary set of feature containers:
retrieving a primary subset of static visual objects, in the set of static visual objects, represented in the feature container;
retrieving a primary media format, in the set of media formats, represented in the feature container; and
generating a primary responsive media, in a primary set of responsive media, by inserting the primary subset of static visual objects into the primary media format according to a primary arrangement of the primary subset of static visual objects represented in the feature container;
presenting the primary set of responsive media to an operator;
in response to receiving a first selection of a primary responsive media, in the primary set of responsive media:
generating a secondary set of feature containers distributed within the multi-dimensional feature space proximal a primary feature container, corresponding to the primary responsive media;
for each feature container, in the secondary set of feature containers:
retrieving a secondary subset of static visual objects, in the set of static visual objects, represented in the feature container;
retrieving a secondary media format, in the set of media formats, represented in the feature container; and
generating a secondary responsive media, in a secondary set of responsive media, by inserting the secondary subset of static visual objects into the secondary media format according to a secondary arrangement of the secondary subset of static visual objects represented in the feature container; and
serving a first secondary responsive media, in the secondary set of responsive media, to a first device for playback to a first user responsive to inputs by the first user at the first device.
2. The method of claim 1:
wherein generating the primary set of feature containers distributed within the multi-dimensional feature space comprises:
pseudo-randomly populating the multi-dimensional feature space with a first quantity of vertices, each vertex in the first quantity of vertices:
corresponding to a feature container of the primary set of feature containers; and
defined by a set of coordinates representing:
a particular media format, in a set of media formats;
a particular static visual object type, in a set of object types;

a particular static visual object dimension, in a set of dimensions; and
a particular static visual object color, in a set of colors; and
wherein generating a primary responsive media for each feature container, in the primary set of feature containers, comprises, for each feature container:
initiating a visual element characterized by the particular media format and including a field for the particular static visual object type; and
inserting a static visual object characterized by the particular static visual object type, the particular static visual object dimension, and the particular static visual object color into the field of the visual element.

3. The method of claim 1, further comprising:
serving a second secondary responsive media, in the secondary set of responsive media, to a second device for playback to a second user;
deriving a first engagement metric representing interaction by the first user with the first secondary responsive media, in the secondary set of responsive media;
deriving a second engagement metric representing interaction by the second user with the second secondary responsive media, in the secondary set of responsive media; and
in response to the first engagement metric exceeding the second engagement metric:
serving the first secondary responsive media to a third device for playback to a third user.

4. The method of claim 1, further comprising:
serving a second secondary responsive media to a second device for playback to a second user;
deriving a first engagement metric representing interaction by the first user with the first secondary responsive media;
deriving a second engagement metric representing interaction by the second user with the second secondary responsive media;
in response to the first engagement metric exceeding the second engagement metric:
generating a tertiary set of feature containers within the multi-dimensional feature space and representing a tertiary set of responsive media, the tertiary set of feature containers:
biased toward a first feature container, in the secondary set of feature containers, corresponding to the first secondary responsive media; and
biased away from a second feature container, in the secondary set of feature containers, corresponding to the second secondary responsive media; and
serving a first tertiary responsive media, in the tertiary set of responsive media, to a third device for playback to a third user.

5. The method of claim 1:
further comprising:
receiving the first selection of a first primary responsive media, the first selection indicating acceptance of a first arrangement of a first combination of a primary subset of static visual objects in the first primary responsive media; and
receiving a second selection of a second primary responsive media, the second selection indicating rejection of a second arrangement of a second combination of a secondary subset of static visual objects in the second primary responsive media; and
wherein generating the secondary set of feature containers distributed within the multi-dimensional feature space comprises:
generating the secondary set of feature containers within the multi-dimensional feature space and representing a secondary set of responsive media, the secondary set of feature containers
biased toward the first feature container, in the primary set of feature containers, corresponding to the first responsive media; and
biased away from a second feature container, in the primary set of feature containers, corresponding to the second responsive media.

6. The method of claim 1:
wherein accessing the set of style rules comprises:
accessing a set of icon rules comprising;
a range of icon dimensions; and
a range of icon orientations;
wherein defining the multi-dimensional feature space bounded by the set of style rules comprises:
constraining a first domain of the multi-dimensional feature space, corresponding to icon dimension, to a set of dimensions within the range of icon dimensions; and
constraining a second domain of the multi-dimensional feature space, corresponding to icon orientation, to a set of orientations within the range of icon orientations; and
wherein for each feature container, in the primary set of feature containers:
retrieving the primary subset of static visual objects, in the set of static visual objects, represented in the feature container comprises:
retrieving an icon of the primary subset of static visual objects characterized by a first icon dimension represented by an icon dimension component of the feature container defining a value within the range of icon dimensions; and
generating the primary responsive media, in a primary set of responsive media, by inserting the primary subset of static visual objects into the primary media format according to a first arrangement of the primary subset of static visual objects represented in the feature container comprises:
inserting the icon into the primary media format in a first icon orientation represented by an icon orientation component of the feature container defining a value within the range of icon orientations.

7. The method of claim 1, further comprising:
in response to receiving a discard instruction from the operator for the primary set of responsive media:
generating a replacement set of feature containers:
distributed within the multi-dimensional feature space; and
differing from the primary set of feature containers;
for each feature container, in the replacement set of feature containers:
retrieving a primary subset of static visual objects, in the set of static visual objects, represented in the feature container;
retrieving a primary media format, in the set of media formats, represented in the feature container; and
generating a primary responsive media, in a replacement set of responsive media, by inserting the primary subset of static visual objects into the primary media format according to a first arrangement of the primary subset of static visual objects represented in the feature container; and
presenting the replacement set of responsive media to the operator.

8. The method of claim 1, further comprising:
accessing a set of verified responsive media;
for each verified responsive media of the set of verified responsive media:
   detecting set of characteristics in the verified responsive media; and
   generating a limit feature container, in a set of limit feature containers, representing an arrangement of the set of characteristics, in the verified responsive media, within the feature space; and
defining a boundary of the multi-dimensional feature space:
   containing the set of limit feature containers; and
   outwardly offset from the set of limit feature containers by a limit distance.

9. The method of claim 8, wherein defining the boundary of the multi-dimensional feature space comprises:
presenting a set of limit distances to the operator;
in response to selection of a first limit distance of the set of limit distances:
   accessing the set of limit feature containers; and
   for each limit feature container:
      defining a volume around the limit feature container comprising a boundary offset from the limit feature by the first limit distance; and
   defining the boundary of the multi-dimensional feature space based on a union of volumes around the set of limit feature containers.

10. The method of claim 1:
wherein accessing the set of static virtual objects comprises:
   accessing a static graphical image depicting a set of visual objects representing advertising content; and
   extracting the set of visual objects from the static graphical image;
wherein retrieving the first primary media format and generating the primary responsive media comprises:
   retrieving the primary media format comprising a sequence of frame templates, each frame template in the sequence frame templates associated with a vertical position of the primary responsive media within a window rendered on a device;
   initializing a first frame, associated with a first vertical position of the primary responsive media within the window rendered on the device, according to a first template frame in the sequence of frames;
   retrieving a first static visual object represented in the feature container;
   inserting the first static visual object into the first frame;
   retrieving the secondary media format comprising a second sequence of frame templates, each frame template in the second sequence frame templates associated with a vertical position of the secondary responsive media within a window rendered on the device;
   initializing a second frame, associated with a second vertical position of the secondary responsive media within the window rendered on the device, according to a second template frame in the sequence of frames;
   retrieving a second static visual object represented in the feature container; and
   inserting the second static visual object into the second frame; and
   assembling the first frame and the second frame into the primary responsive media; and
wherein presenting the primary set of responsive media to the operator comprises:
   serving the primary responsive media to a first visual element loaded into a window of a first computing device accessed by the operator;
   at the visual element:
      in response to a first vertical scroll event that moves the visual element vertically from an initial position to a first position within the window, rendering the first frame, in the primary responsive media, within the window; and
      in response to a second vertical scroll event that moves the visual element vertically from the first position to the second position within the window, rendering the second frame in the primary responsive media, within the window.

11. The method of claim 1:
wherein accessing the set of static virtual objects comprises:
   accessing a static graphical image depicting a set of visual objects representing advertising content; and
   extracting the set of visual objects from the static graphical image;
wherein retrieving the first primary media format and generating the primary responsive media comprises:
   retrieving the primary media format comprising a sequence of frame templates, each frame template in the sequence frame templates associated with a horizontal position of the primary responsive media within a window rendered on a device;
   initializing a first frame, associated with a first horizontal position of the primary responsive media within the window rendered on the device, according to a first template frame in the sequence of frames;
   retrieving a first static visual object represented in the feature container;
   inserting the first static visual object into the first frame;
   initializing a second frame, associated with a second vertical position of the secondary responsive media within the window rendered on the device, according to a second template frame in the sequence of frames;
   retrieving a second static visual object represented in the feature container; and
   inserting the second static visual object into the second frame; and
   assembling the first frame and the second frame into the primary responsive media; and
wherein presenting the primary set of responsive media to the operator comprises:
   serving the primary responsive media to a first visual element loaded into a window of a first computing device accessed by the operator; and
   at the visual element:
      in response to a first horizontal scroll event that moves the visual element horizontally from an initial position to a first position within the window, rendering the first frame comprising the first static visual object, in the primary responsive media, within the window; and
      in response to a second horizontal scroll event that moves the visual element horizontally from the first position to the second position within the window, rendering the second frame comprising the second static visual object in the primary responsive media, within the window.

12. The method of claim 1:
wherein accessing the set of static visual objects comprises:
  accessing a digital advertisement image; and
  accessing an icon associated with the digital advertisement image;
wherein generating the primary responsive media, for each feature container in the primary set of feature containers, comprises, for each feature container in the primary set of feature containers:
  retrieving the primary media format comprising a background layer and an overlaid window layer;
  inserting the digital advertisement image into the background layer; and
  inserting the icon into the overlaid window layer, the icon:
    arranged overlaid on the digital advertisement image;
    comprising a base layer defining a first opacity; and
    comprising an aperture:
      defining a second opacity less than the first opacity and an outline associated with the digital advertisement; and
      configured to reveal a proportion of the digital advertisement linked to a vertical position of the visual element within the window; and
wherein presenting the primary set of responsive media to the operator comprises:
  serving the primary responsive media to a first visual element loaded into a window of a first computing device accessed by the operator; and
  at the visual element:
    in response to an initial scroll event, entered by the user at the computing device, that moves the visual element to a first vertical position within the window:
      rendering the digital advertisement within the visual element; and
      rendering the icon over the digital advertisement, the aperture revealing a first proportion of the digital advertisement; and
    in response to a first scroll-down event that moves the visual element toward a second vertical position above the first vertical position within the window, transforming the aperture at a rate corresponding to a scroll rate of the first scroll-down event to reveal an increasing proportion of the digital advertisement.

13. The method of claim 1:
wherein accessing the set of static visual objects comprises:
  accessing a background image;
  accessing a set of icons; and
  accessing a set of hyperlinks corresponding to the set of icons;
wherein retrieving the primary media format and generating the primary responsive media, for each feature container in the primary set of feature containers, comprises, for each feature container in the primary set of feature containers:
  for each icon in the set of icons:
    embedding a hyperlink of the set of hyperlinks within the icon; and
    inserting the set of icons overlaid on the background image into the primary media format; and
wherein presenting the primary set of responsive media to the operator:
  serving the primary responsive media to a first visual element loaded into a window of a first computing device accessed by the operator;
  in response to a first swipe input, entered by the operator at the first computing device, over the visual element, indexing through the set of icons rendered over the background image within the visual element; and
  in response to selection of a first icon, in the set of icons, within the visual element by the operator:
    triggering the computing device to open an expanded window over the electronic document;
    rendering expanded variants of icons, in the set of icons, within the expanded window;
    in response to a second swipe input over the expanded window, indexing through expanded variants of the set of icons rendered within the expanded window; and
    in response to selection of a first expanded variant of a first icon, in the set of icons, within the expanded window, the first icon comprising a first link, triggering the computing device to navigate to a first external document associated with the first icon based on the first link.

14. The method of claim 1:
wherein generating the primary set of feature containers comprises:
  generating a first primary feature container:
    defining a first subset of static visual objects;
    defining a first format; and
    representing a first primary responsive media; and
  generating a second primary feature container:
    defining a second subset of static visual objects;
    a second format; and
    representing a second primary responsive media;
wherein presenting the primary set of responsive media to an operator comprises:
  presenting the first primary responsive media to the operator; and
  presenting the secondary primary responsive media to the operator;
further comprising receiving the first selection of the first primary responsive media; and
wherein generating the secondary set of feature containers distributed within the multi-dimensional feature space proximal the first primary feature container, corresponding to the first primary responsive media comprises:
  generating a first secondary feature container:
    defining the second subset of static visual objects;
    defining the first format; and
    representing a first secondary responsive media.

15. A method comprising:
accessing a set of static visual objects;
accessing a set of style rules;
accessing a set of media formats;
defining a multi-dimensional feature space:
  representing possible arrangements of combinations of the set of static visual objects within the set of media formats; and comprising a boundary defined by the set of style rules;
during a first time interval, generating as primary set of feature containers distributed within the multi-dimensional feature space;
for each feature container, in the primary set of feature containers:
retrieving a primary subset of static visual objects, in the set of static visual objects, represented in the feature container;
retrieving a primary media format, in the set of media formats, represented in the feature container; and
generating a primary responsive media, in a primary set of responsive media, by inserting the primary subset of static visual objects into the primary media format according to a primary arrangement of the primary subset of static visual objects represented in the feature container;
during a second time interval succeeding the first time interval:
serving a first primary responsive media, in the primary set of responsive media, to a first device for playback to a first user responsive to inputs by the first user at the first device;
serving a second primary responsive media, in the primary set of responsive media, to a second device for playback to a second user responsive to inputs by the second user at the second device;
deriving a first engagement metric representing interaction by the first user with the first primary responsive media, in the primary set of responsive media; and
deriving a second engagement metric representing interaction by the second user with the second primary responsive media, in the primary set of responsive media; and
during a third time interval succeeding the second time interval:
in response to the first engagement metric exceeding the second engagement metric:
generating a secondary set of feature containers distributed within the multi-dimensional feature space representing a secondary set of responsive media, the secondary set of feature containers biased:
toward a first primary feature container, in the primary set of feature containers, corresponding to the first primary responsive media; and
away from a second primary feature container, in the primary set of feature containers, corresponding to the second primary responsive media; and
serving a third secondary responsive media, in the secondary set of responsive media, to a third device for playback to a third user.

16. The method of claim 15, further comprising:
accessing a set of verified responsive media;
for each verified responsive media in the set of verified responsive media:
detecting set of characteristics in the verified responsive media; and
generating limit feature container, in a set of limit feature containers in feature space, representing an arrangement of the set of characteristics in the verified responsive media; and
defining a boundary of the multi-dimensional feature space:
containing the set of limit feature containers; and
outwardly offset by a limit distance from the set of limit feature containers.

17. The method of claim 15, further comprising:
deriving a third engagement metric representing interaction by the third user with the third responsive media, in the secondary set of responsive media; and
in response to the third engagement metric falling below a minimum engagement metric threshold:
constraining the boundary of the multi-dimensional feature space to omit a third feature container in the secondary set of feature containers corresponding to the third responsive media to remove an arrangement of a combination of a third subset of static visual objects represented in the third feature container.

18. The method of claim 15, further comprising:
during an initial time interval preceding the first time interval:
generating an initial set of feature containers distributed within the multi-dimensional feature space representing an initial set of responsive media;
presenting the initial set of responsive media to an operator; and
in response to receiving a first selection of a first responsive media, in the initial set of responsive media:
generating the primary set of feature containers distributed within the multi-dimensional feature space proximal a first feature container corresponding to the first responsive media.

19. The method of claim 15:
wherein accessing the set of static virtual objects comprises:
accessing a static graphical image depicting a set of visual objects representing advertising content; and
extracting the set of visual objects from the static graphical image;
wherein retrieving the first primary media format and generating the primary responsive media comprise:
retrieving the primary media format comprising a sequence of frame templates, each frame template in the sequence frame templates associated with a vertical position of the primary responsive media within a window rendered on a device;
initializing a first frame, associated with a first vertical position of the primary responsive media within the window rendered on the device, according to a first template frame in the sequence of frames;
retrieving a first static visual object represented in the feature container;
inserting the first static visual object into the first frame;
retrieving the secondary media format comprising a second sequence of frame templates, each frame template in the second sequence frame templates associated with a vertical position of the secondary responsive media within a window rendered on the device;
initializing a second frame, associated with a second vertical position of the secondary responsive media within the window rendered on the device, according to a second template frame in the sequence of frames;
retrieving a second static visual object represented in the feature container; and
inserting the second static visual object into the second frame; and
assembling the first frame and the second frame into the primary responsive media; and wherein presenting the primary set of responsive media to the operator comprises:
- serving the primary responsive media to a first visual element loaded into a window of a first computing device accessed by the operator;
- at the visual element:
  - in response to a first vertical scroll event that moves the visual element vertically from an initial position to a first position within the window, rendering the first frame, in the primary responsive media, within the window; and
  - in response to a second vertical scroll event that moves the visual element vertically from the first position to the second position within the window, rendering the second frame in the primary responsive media, within the window.

20. A method comprising:
- accessing a set of static visual objects;
- accessing a set of style rules;
- accessing a set of media formats;
- defining a multi-dimensional feature space:
  - representing possible arrangements of combinations of the set of static visual objects within the set of media formats; and
  - bounded by the set of style rules;
- generating a primary set of feature containers distributed within the multi-dimensional feature space;
- for each feature container, in the primary set of feature containers:
  - retrieving a primary subset of static visual objects, in the set of static visual objects, represented in the feature container;
  - retrieving a primary media format, in the set of media formats, represented in the feature container; and
  - generating a primary responsive media, in a primary set of responsive media, by inserting the primary subset of static visual objects into the primary media format according to a primary arrangement of the primary subset of static visual objects represented in the feature container;
- presenting the primary set of responsive media to an operator;
- in response to receiving a first selection of a primary responsive media, in the primary set of responsive media:
  - generating a secondary set of feature containers distributed within the multi-dimensional feature space proximal a primary feature container, corresponding to the primary responsive media;
  - for each feature container, in the secondary set of feature containers:
    - retrieving a secondary subset of static visual objects, in the set of static visual objects, represented in the feature container;
    - retrieving a secondary media format, in the set of media formats, represented in the feature container; and
    - generating a secondary responsive media, in a secondary set of responsive media, by inserting the secondary subset of static visual objects into the secondary media format according to a secondary arrangement of the secondary subset of static visual objects represented in the feature container;
- serving a first secondary responsive media, in the secondary set of responsive media, to a first device for playback to a first user responsive to inputs by the first user at the first device;
- deriving a first engagement metric representing interaction by the first user with the first secondary responsive media, in the secondary set of responsive media;
- in response to the first engagement metric exceeding a threshold engagement:
  - generating a tertiary set of feature containers within the multi-dimensional feature space and representing a tertiary set of responsive media, the tertiary set of feature containers biased toward a first feature container, in the secondary set of feature containers, corresponding to the first secondary responsive media;
- in response to the first engagement metric falling below a threshold engagement:
  - generating a tertiary set of feature containers within the multi-dimensional feature space and representing a tertiary set of responsive media, the tertiary set of feature containers biased away from a first feature container, in the secondary set of feature containers, corresponding to the first secondary responsive media; and
- serving a first tertiary responsive media first of the tertiary set of responsive media to a second device for playback to a second user responsive to inputs by the second user at the second device.

* * * * *